United States Patent
O'Shea et al.

(10) Patent No.: US 10,859,668 B2
(45) Date of Patent: Dec. 8, 2020

(54) DETECTING RADIO SIGNAL EMITTER LOCATIONS

(71) Applicant: HawkEye 360, Inc., Herndon, VA (US)

(72) Inventors: Timothy James O'Shea, Arlington, VA (US); Robert W. McGwier, Elliston, VA (US); Nicholas Aaron McCarthy, Arlington, VA (US)

(73) Assignee: HawkEye 360, Inc., Herndon, VA (US)

( * ) Notice: Subject to any disclaimer, the term of this patent is extended or adjusted under 35 U.S.C. 154(b) by 0 days.

(21) Appl. No.: 16/671,398

(22) Filed: Nov. 1, 2019

(65) Prior Publication Data

US 2020/0064434 A1 Feb. 27, 2020

Related U.S. Application Data

(63) Continuation of application No. 16/000,934, filed on Jun. 6, 2018, now Pat. No. 10,466,336.

(Continued)

(51) Int. Cl.
- *G01S 5/02* (2010.01)
- *G01S 19/32* (2010.01)

(Continued)

(52) U.S. Cl.
CPC .............. *G01S 5/0268* (2013.01); *G01S 5/02* (2013.01); *G01S 5/0221* (2013.01);
(Continued)

(58) Field of Classification Search
CPC ........ G01S 5/0268; G01S 19/426; G01S 5/10; G01S 5/0278; G01S 5/0221; G01S 19/32
(Continued)

(56) References Cited

U.S. PATENT DOCUMENTS

| 3,699,577 A | 10/1972 | Shadle |
| 3,745,571 A | 7/1973 | Chwastyk |

(Continued)

FOREIGN PATENT DOCUMENTS

| JP | 2013/029419 | 2/2013 |
| WO | WO 2014/086588 | 6/2014 |

OTHER PUBLICATIONS

Anthony J. Weiss, Direct Geolocation of Wideband Emitters Based on Delay and Doppler, Jun. 2011, IEEE Transactions on Signal Processing, vol. 59, No. 6, pp. 2513-2521.

(Continued)

*Primary Examiner* — Congvan Tran
(74) *Attorney, Agent, or Firm* — Fish & Richardson P.C.

(57) ABSTRACT

First information is obtained from a sensing device at a first time. The first information corresponds to a radio signal received at the device from a candidate location. The device is at a first location at the first time. Second information is obtained from the device at a second time. The second information corresponds to a radio signal received at the device from the candidate location. The device is at a second location at the second time. A system determines that a pattern is in each of the first and second information and determines relationships between the candidate location and the device at each first and second location. The system obtains inverses of the relationships and determines estimates of the received radio signals based on the information and inverses. The system measures or estimates energy emitted from the candidate location based on the estimates.

22 Claims, 6 Drawing Sheets

Related U.S. Application Data

(60) Provisional application No. 62/527,510, filed on Jun. 30, 2017.

(51) Int. Cl.
  *G01S 5/10* (2006.01)
  *G01S 19/42* (2010.01)
  *H04W 64/00* (2009.01)
  *G01S 5/00* (2006.01)

(52) U.S. Cl.
  CPC ............ *G01S 5/0278* (2013.01); *G01S 5/10* (2013.01); *G01S 19/32* (2013.01); *G01S 19/426* (2013.01); *G01S 5/0036* (2013.01); *G01S 5/0242* (2013.01); *H04W 64/003* (2013.01); *H04W 64/006* (2013.01)

(58) Field of Classification Search
  USPC .............................. 455/427, 404.2, 456, 457
  See application file for complete search history.

(56) References Cited

U.S. PATENT DOCUMENTS

| | | | |
|---|---|---|---|
| 3,795,911 A * | 3/1974 | Hammack | G01S 1/302 342/106 |
| 3,996,590 A * | 12/1976 | Hammack | G01S 1/302 342/465 |
| 4,057,800 A | 11/1977 | Ganz | |
| 5,008,679 A | 4/1991 | Effland et al. | |
| 5,317,323 A | 5/1994 | Kennedy et al. | |
| 5,373,236 A | 12/1994 | Tsui et al. | |
| 5,406,291 A | 4/1995 | Guerci et al. | |
| 5,490,079 A | 2/1996 | Sharpe | |
| 5,534,866 A | 7/1996 | Rose | |
| 5,570,099 A | 10/1996 | DesJardins | |
| 5,673,305 A | 9/1997 | Ross | |
| 5,686,888 A | 11/1997 | Welles | |
| 5,734,478 A | 3/1998 | Magome | |
| 5,774,087 A | 6/1998 | Rose | |
| 5,835,060 A | 11/1998 | Czarnecki | |
| 5,874,916 A | 2/1999 | Desjardins | |
| 5,914,687 A | 6/1999 | Rose | |
| 6,239,748 B1 | 5/2001 | Gilhousen | |
| 6,407,703 B1 | 6/2002 | Minter et al. | |
| 6,433,740 B1 | 8/2002 | Gilhousen | |
| 6,470,097 B1 | 10/2002 | Lai | |
| 6,577,272 B1 | 6/2003 | Madden | |
| 6,677,893 B2 | 1/2004 | Rideout | |
| 6,683,568 B1 | 1/2004 | James | |
| 6,734,824 B2 | 5/2004 | Herman | |
| 6,933,888 B1 | 8/2005 | Schiffmiller et al. | |
| 6,959,048 B1 | 10/2005 | Horneman et al. | |
| 7,091,926 B2 | 8/2006 | Kulas | |
| 7,236,119 B2 | 6/2007 | Gounalis | |
| 7,256,737 B2 | 8/2007 | Hall | |
| 7,342,536 B2 | 3/2008 | Johnson | |
| 7,440,762 B2 | 10/2008 | Maloney | |
| 7,508,344 B2 | 3/2009 | Stroud | |
| 7,561,105 B2 | 7/2009 | Murphy | |
| 7,579,989 B2 | 8/2009 | Winterling | |
| 7,626,536 B1 | 12/2009 | Rihaczek | |
| 7,626,538 B2 | 12/2009 | Rose | |
| 7,626,546 B2 | 12/2009 | Chung | |
| 7,916,085 B2 | 3/2011 | Kimball | |
| 7,917,103 B2 | 3/2011 | Feher | |
| 7,925,274 B2 | 4/2011 | Anderson | |
| 7,999,739 B2 | 8/2011 | Ferreol et al. | |
| 8,004,464 B2 | 8/2011 | Koutsogiannis | |
| 8,059,700 B2 | 11/2011 | Lopez-Risueno | |
| 8,090,384 B2 | 1/2012 | Alles | |
| 8,160,609 B2 | 4/2012 | Alles | |
| 8,164,519 B1 | 4/2012 | Bedoya Martinez | |
| 8,188,920 B2 | 5/2012 | Thomson | |
| 8,193,981 B1 | 6/2012 | Hwang | |
| 8,249,622 B2 | 8/2012 | Alles | |
| 8,289,210 B2 | 10/2012 | Thomson | |
| 8,351,961 B2 | 1/2013 | Olbers | |
| 8,380,222 B2 | 2/2013 | Alles | |
| 8,477,877 B2 | 7/2013 | Zhou | |
| 8,489,122 B2 | 7/2013 | Gravely | |
| 8,559,491 B2 | 10/2013 | Chevalier | |
| 8,565,798 B2 | 10/2013 | Parker | |
| 8,682,182 B2 | 3/2014 | Zhou | |
| 8,837,947 B2 | 9/2014 | Gabory | |
| 8,861,647 B2 | 10/2014 | Zhou | |
| 8,866,672 B2 | 10/2014 | Stroud | |
| 8,878,725 B2 | 11/2014 | Lu | |
| 8,897,813 B2 | 11/2014 | Hannan | |
| 8,908,809 B2 | 12/2014 | Zhou | |
| 8,930,088 B2 | 1/2015 | Bauer | |
| 8,996,031 B2 | 3/2015 | Austin | |
| 9,035,762 B2 | 5/2015 | Cutler | |
| 9,086,471 B2 | 7/2015 | Mengwasser | |
| 9,086,741 B2 | 7/2015 | Mengwasser | |
| 9,203,511 B2 | 12/2015 | Zhou | |
| 9,240,628 B2 | 1/2016 | Duncan | |
| 9,279,880 B2 | 3/2016 | McCorkle | |
| 9,316,719 B1 | 4/2016 | Sternowski | |
| 9,331,798 B2 | 5/2016 | Beck | |
| 9,523,761 B1 | 12/2016 | Hoffmann | |
| 9,634,719 B2 | 4/2017 | Rakib | |
| 9,661,604 B1 | 5/2017 | O'Shea et al. | |
| 9,891,306 B2 | 2/2018 | Wellman | |
| 10,057,873 B2 | 8/2018 | O'Shea | |
| 2003/0151562 A1 | 8/2003 | Kulas | |
| 2004/0027276 A1 | 2/2004 | Herman | |
| 2004/0075605 A1 | 4/2004 | Bradford | |
| 2004/0189525 A1 | 9/2004 | Beadle | |
| 2005/0148346 A1 | 7/2005 | Maloney | |
| 2006/0273960 A1 | 12/2006 | Murphy | |
| 2007/0120738 A1 | 5/2007 | Stroud | |
| 2007/0183519 A1 | 8/2007 | Dang | |
| 2007/0189404 A1 | 8/2007 | Baum | |
| 2008/0248811 A1 | 10/2008 | Maloney | |
| 2009/0079634 A1 | 3/2009 | Rose | |
| 2009/0168730 A1 | 7/2009 | Baum | |
| 2009/0219202 A1 | 9/2009 | Pon | |
| 2009/0267836 A1 | 10/2009 | Falk | |
| 2010/0052990 A1 | 3/2010 | Bull et al. | |
| 2010/0061427 A1 | 3/2010 | Lopez-Risueno | |
| 2010/0220011 A1 | 9/2010 | Heuser | |
| 2011/0122014 A1 | 5/2011 | Szajnowski | |
| 2011/0143772 A1 | 6/2011 | Sridhara | |
| 2011/0273334 A1 | 11/2011 | Karr | |
| 2011/0280293 A1 | 11/2011 | Chevalier | |
| 2012/0252357 A1 | 10/2012 | Tarleton | |
| 2012/0258659 A1 | 10/2012 | Emmons | |
| 2012/0293371 A1 | 11/2012 | Lu | |
| 2012/0320442 A1 | 12/2012 | Gabory | |
| 2013/0265198 A1 | 10/2013 | Stroud | |
| 2014/0155085 A1 | 6/2014 | Kosseifi | |
| 2014/0221005 A1 | 8/2014 | Marshall | |
| 2014/0266910 A1 | 9/2014 | Gates | |
| 2014/0278214 A1 | 9/2014 | Broad | |
| 2014/0361939 A1 | 12/2014 | Duncan | |
| 2015/0241545 A1* | 8/2015 | Lehtomaki | G01S 3/14 342/417 |
| 2015/0268349 A1 | 9/2015 | Veysoglu et al. | |
| 2015/0308839 A1 | 10/2015 | Jiang | |
| 2015/0319634 A1 | 11/2015 | Zwirn | |
| 2015/0326273 A1 | 11/2015 | Rakib | |
| 2015/0327085 A1 | 11/2015 | Hadani | |
| 2016/0018509 A1 | 1/2016 | McCorkle | |
| 2016/0033649 A1 | 2/2016 | Mathews | |
| 2016/0036957 A1 | 2/2016 | Van Meter | |
| 2016/0043881 A1 | 2/2016 | Forte | |
| 2016/0066157 A1 | 3/2016 | Noorshams | |
| 2016/0119806 A1 | 4/2016 | Carbajal | |
| 2016/0146923 A1 | 5/2016 | McCorkle | |
| 2016/0151045 A1 | 6/2016 | Pelissier et al. | |
| 2016/0204861 A1 | 7/2016 | Boroson | |
| 2016/0204865 A1 | 7/2016 | Boroson | |
| 2016/0204866 A1 | 7/2016 | Boroson | |

(56) References Cited

U.S. PATENT DOCUMENTS

| | | |
|---|---|---|
| 2016/0299212 A1 | 10/2016 | Broad |
| 2017/0003376 A1 | 1/2017 | Wellman |
| 2017/0010121 A1 | 1/2017 | Shashua |
| 2017/0102466 A1 | 4/2017 | Petkus et al. |
| 2017/0148340 A1* | 5/2017 | Popa-Simil ............. G06F 30/20 |
| 2017/0164227 A1 | 6/2017 | Zwirn |
| 2017/0264381 A1 | 9/2017 | Mengwasser |
| 2018/0088220 A1 | 3/2018 | Flynn |
| 2018/0109284 A1 | 4/2018 | Hadani |
| 2018/0137601 A1 | 5/2018 | Takazawa |
| 2018/0205481 A1 | 7/2018 | Shlomo |
| 2019/0004144 A1 | 1/2019 | O'Shea |

OTHER PUBLICATIONS

EP Extended European Search Report in European Appln. No. 17820961.5, dated Jun. 26, 2019, 9 pages.

International Search Report and Written Opinion in International Application No. PCT/US17/38759, dated Aug. 1, 2017.

International Search Report and Written Opinion in International Application No. PCT/US2018/36186, dated Aug. 24, 2018, 19 pages.

Mazal & Gurfil, "Closed-loopdistance-keeping for long-term satellite cluster flight," Acta Astronautica, 2014, 94:73-82.

PCT International Preliminary Report on Patentability for International Appln. No. PCT/US2018/036186, dated Jan. 9, 2020, 11 pages.

U.S. Appl. No. 10/440,667, filed May 19, 2003, Vera et al.

* cited by examiner

DETECTING RADIO SIGNAL EMITTER LOCATIONS

CROSS REFERENCE TO RELATED APPLICATIONS

This application is a continuation of U.S. application Ser. No. 16/000,934 filed Jun. 6, 2018, which claims the benefit of priority under 35 U.S.C. § 119(e) of U.S. Provisional Application No. 62/527,510, filed on Jun. 30, 2017, and entitled "Detecting Radio Signal Emitter Location Using Patterned Blind Coherent Integration (PBCI)," all of which is incorporated herein by reference in its entirety.

TECHNICAL FIELD

The following disclosure relates generally to systems and techniques for determining emitter locations.

BACKGROUND

Various electrical devices emit radio signals. For example, communications radios, emergency safety beacons, radars, television broadcast towers, wireless access points, cellular towers, cellular phones, and satellite phones, among other radio emitters, transmit radio signals that can be received by other devices. To determine a location of these signal emitters, localization techniques often rely on some form of triangulation based on a difference measurement of time or frequency of a signal to several receivers. Typically, detectors and timing and frequency estimation techniques are designed for a specific signal of interest. A particular type of geolocation system that employs a specific signal analysis technique may be needed to localize various signal types of interest.

SUMMARY

The present disclosure describes devices, systems and techniques for determining locations of electrical devices based on receiving the radio signals emitted by the electrical devices at one or more sensing devices. In some implementations, radio signals detected by a single sensing device are used to determine locations of an electrical device. In such implementations, the radio signals received by the sensing device are processed using pattern blind coherent integration (PBCI) techniques to estimate energies of the emitted radio signals. A search is performed using the estimated energies and based on known candidate locations and known radio signal pattern information to determine the actual locations of the electrical devices from which the radio signals are received. In this context, an electrical device emitting a radio signal is also referred to as an emitter or a wireless transmitter, while a sensing device receives radio signals from an emitter using one or more radio signal receivers that are referred to as sensors.

In some implementations, the sensors are located on board a single mobile platform. The mobile platform receives radio signals from emitters on the Earth's surface, and processes the signals, either on board the mobile platform, or by sending the received signals to a processing station. In some implementations, when processing the received signals, a determination is made whether the signal reception times measured by the mobile platform are consistent with one another, e.g., whether the system clock on the mobile platform is stable in time and frequency. In some implementations, the mobile platform is an orbiting satellite. In such implementations, the corresponding processing station is a satellite ground station.

One aspect of the subject matter described in this specification can be embodied in a computer-implemented method. The method comprises obtaining, from a sensing device at a first time, first information corresponding to a radio signal received at the sensing device from a candidate location, where the sensing device is at a first location in its movement trajectory at the first time; obtaining, from the sensing device at a second time, second information corresponding to a radio signal received at the sensing device from the candidate location, wherein the sensing device is at a second location in its movement trajectory at the second time; and determining that a known pattern is present in each of the first information and the second information. The method further includes, conditioned on determining that the known pattern is present in each of the first information and the second information: i) determining a first relationship between the candidate location and the sensing device at the first location, and a second relationship between the candidate location and the sensing device at the second location; ii) obtaining a first inverse of the first relationship and a second inverse of the second relationship; iii) determining a first estimate of the radio signal received at the sensing device from the candidate location based on the first information and the first inverse, and a second estimate of the radio signal received at the sensing device from the candidate location based on the second information and the second inverse; and iv) determining an estimate of an energy emitted from the candidate location based on the first estimate and the second estimate.

These and other implementations can each optionally include one or more of the following features. For example, in some implementations, determining the estimate of the energy emitted from the candidate location based on the first estimate and the second estimate further comprises: obtaining, from the sensing device at a third time, third information corresponding to the radio signal received at the sensing device from the candidate location, wherein the sensing device is at a third location in its movement trajectory at the third time; determining that the known pattern is present in the third information; conditioned on determining that the known pattern is present in the third information: i) determining a third relationship between the candidate location and the sensing device at the third location; ii) obtaining a third inverse of the third relationship; iii) determining a third estimate of the radio signal received at the sensing device from the candidate location based on the third information and the third inverse; and iv) determining the estimate of the energy emitted from the candidate location based on the first estimate, the second estimate and the third estimate.

In some implementations, the movement trajectory of the sensing device is a known trajectory. In some implementations, determining that the known pattern is present in each of the first information and the second information comprises: determining that a system clock corresponding to operation of the sensing device has an accuracy within a pre-selected threshold value. In some implementations, determining the estimate of the energy emitted from the candidate location based on the first estimate and the second estimate comprises determining a distance metric between the first estimate and the second estimate, and determining the estimate of the energy as a function of the distance metric, wherein the distance metric is based on a coherent reception of the radio signal at the sensing device at the first location and the second location, and wherein the coherent reception of the radio signal is based on the accuracy of the system clock being within the pre-selected threshold value.

In some implementations, the distance metric includes one of an L2 error distance, an LN error distance or a complex cross power distance, or another similar distance metric. In some implementations, the system clock is synchronized with a reference clock. In some implementations, the reference clock is associated with one of a Global Navigation Satellite System (GNSS) signal, a Global Positioning System (GPS) signal, or another secondary emission system that can be used as a timing source or reference. In some implementations, the method further includes: sending, to the sensing device, an instruction signal, the instruction signal directing the sensing device to synchronize the system clock with the reference clock. In some implementations, determining the first relationship between the sensing device and the candidate location comprises: determining a delay associated with the radio signal received from the candidate location when the sensing device is at the first location; and determining a Doppler offset associated with the radio signal received from the candidate location when the sensing device is at the first location, wherein at least one of the delay or the Doppler offset is determined based on knowledge of the movement trajectory of the sensing device.

In some implementations, obtaining the first inverse of the first relationship comprises: determining an inverse of the delay associated with the radio signal received from the candidate location when the sensing device is at the first location; and determining an inverse of the Doppler offset associated with the radio signal received from the candidate location when the sensing device is at the first location. In some implementations, obtaining the first inverse of the first relationship comprises: obtaining a prediction of the candidate location; obtaining knowledge of the movement trajectory of the sensing device; determining the first location of the sensing device based on the knowledge of the trajectory; and obtaining the first inverse of the first relationship based on the prediction of the candidate location and the first location of the sensing device.

In some implementations, determining the first estimate of the radio signal comprises: computing a convolution of: (i) the first information and (ii) the first inverse of the first relationship. In some implementations, determining the first estimate of the radio signal comprises (i) applying one or more of a time interpolation, re-sampling and shifting process to the first inverse, and (ii) mixing the first inverse with a local digital oscillator, and wherein determining the second estimate of the radio signal comprises (i) applying one or more of a time interpolation, re-sampling and shifting process to the second inverse, and (ii) mixing the second inverse with the local digital oscillator.

In some implementations, the method further includes: determining an estimate of energy emitted from a plurality of candidate locations, wherein radio signals from the plurality of candidate locations are received at the sensing device at different times and at different locations, and wherein information corresponding to the radio signals from the plurality of candidate locations are obtained from the sensing device; generating an energy profile for a geographic region based on the estimate of energy emitted from the plurality of candidate locations; determining an energy density for the geographic region, wherein the energy density is proportional to a number of the candidate locations corresponding to which emitted energy are measured or estimated; identifying a first search area in the geographic region associated with a first candidate location based on the determination of the energy density; and performing a search in the first search area for target signal transmitter associated with the first candidate location.

In some implementations, performing the search for signal transmitters in the first search area comprises: determining a highest estimated value of energy emitted from candidate locations in the first search area; and identifying a candidate location corresponding to the highest estimated value of energy as actual location of the target signal transmitter. In some implementations, performing the search for signal transmitters in the first search area comprises: determining a first highest estimated value of energy emitted from candidate locations in the first search area; and identifying a candidate location corresponding to the first highest estimated value of energy; determining a second search area in the geographic region associated with the identified candidate location, wherein the second search area corresponds to a sub-region of the first search area; performing a search in the second search area for the target signal transmitter; determining a second highest estimated value of energy emitted from candidate locations in the second search area; and identifying a candidate location corresponding to the second highest estimated value of energy as an actual location of the target signal transmitter.

In some implementations, the method further includes: comparing energy emitted from candidate locations in the first search area to a threshold energy value; determining a subset of candidate locations in the first search area with emitted energy greater than the threshold energy value; identifying a second search area associated with the subset of candidate locations; and performing a search in the second search area for the target signal transmitter. In some implementations, the sensing device includes a sensor on a mobile platform that is communicably coupled to a ground receiving station, wherein obtaining the first information and the second information corresponding to the radio signal comprises obtaining, at the ground receiving station, the first information and the second information from the mobile platform.

In some implementations, the mobile platform includes one of a Low Earth Orbit (LEO) satellite, a Medium Earth Orbit (MEO) satellite, a Geosynchronous Orbit (GEO) satellite, a nano satellite, an unmanned aerial vehicle (UAV) or a terrestrial vehicle. In some implementations, obtaining the first information and the second information comprises obtaining, at a computing unit onboard the sensing device, the first information and the second information from a sensor coupled to the sensing device. In some implementations, the sensing device includes one of a Low Earth Orbit (LEO) satellite, a Medium Earth Orbit (MEO) satellite, a Geosynchronous Orbit (GEO) satellite, a nano satellite, an unmanned aerial vehicle (UAV), a terrestrial vehicle, a spacecraft or a mobile platform.

Implementations of the above techniques include methods, apparatus, computer program products and systems for performing the above-described actions. Such a computer program product is embodied in a non-transitory machine-readable medium that stores instructions executable by one or more processors. The instructions are configured to cause the one or more processors to perform the above-described actions. One such system includes two or more sensing device and one or more computing units that are configured to perform the above-described actions upon receiving radio signals from the sensing device.

Particular implementations of the subject matter described in this specification realize one or more of the following advantages. The systems and techniques described herein can be used to perform general mapping and geolocation of coherent radio energy emitted from any stable location, e.g., on the Earth's surface. This is used to map commercial radio usage, deployment, spectrum occupancy and regulatory compliance for a wide range of commercial and other applications, among others. In contrast to other approaches, the systems and techniques described herein can perform accurate mapping and geolocation of emitters without using specific knowledge about the emitter signals (e.g., exact transmitted values), other than using a known pattern data of the signals (e.g., frame-periodicity of the signal). Additionally or alternatively, the systems and techniques described herein can be used to perform mapping and geolocation of emitters without relying on information about direction of arrival of energy signals. Accordingly, the systems and techniques are useful for performing mapping and geolocation using spacecraft, e.g., satellites, which do not separate multiple signals arriving at the spacecraft.

The systems and techniques described herein can also improve the hardware functionality of the associated sensing device. For example, the processing speed of the sensing device and/or the amount of data required to perform geolocation can be improved (e.g., by reducing an amount of data required to perform geolocation), compared to conventional approaches. Additionally or alternatively, the systems and techniques can provide accurate results using a single sensing device with limited hardware resources. The energy spent by the sensing device to process the emitter signals and perform geolocation and mapping also can be reduced, compared to conventional approaches. This is useful for spacecraft, e.g., satellites, which have limited processing resources and constrained energy sources.

Another advantage is that the described systems and techniques enable sensing of emitter signals without requiring prior knowledge of the signal type, emitter structure, or signal content. The patterned blind coherent integration approaches described herein allow estimation of time or frequency of arrival of emitter signals without dependence on knowledge of the signal format or structure, other than some limited information about the signal, such as a repeating patterned time or frequency structure, or a search over these temporal/spectral repetition distances if the repeating patterned time or frequency structure is unknown, in contrast to conventional approaches that depend on such knowledge of the signal format, structure or specific reference signals used.

The details of one or more disclosed implementations are set forth in the accompanying drawings and the description below. Other features, aspects, and advantages will become apparent from the description, the drawings and the claims.

DETAILED DESCRIPTION

Figure 1:
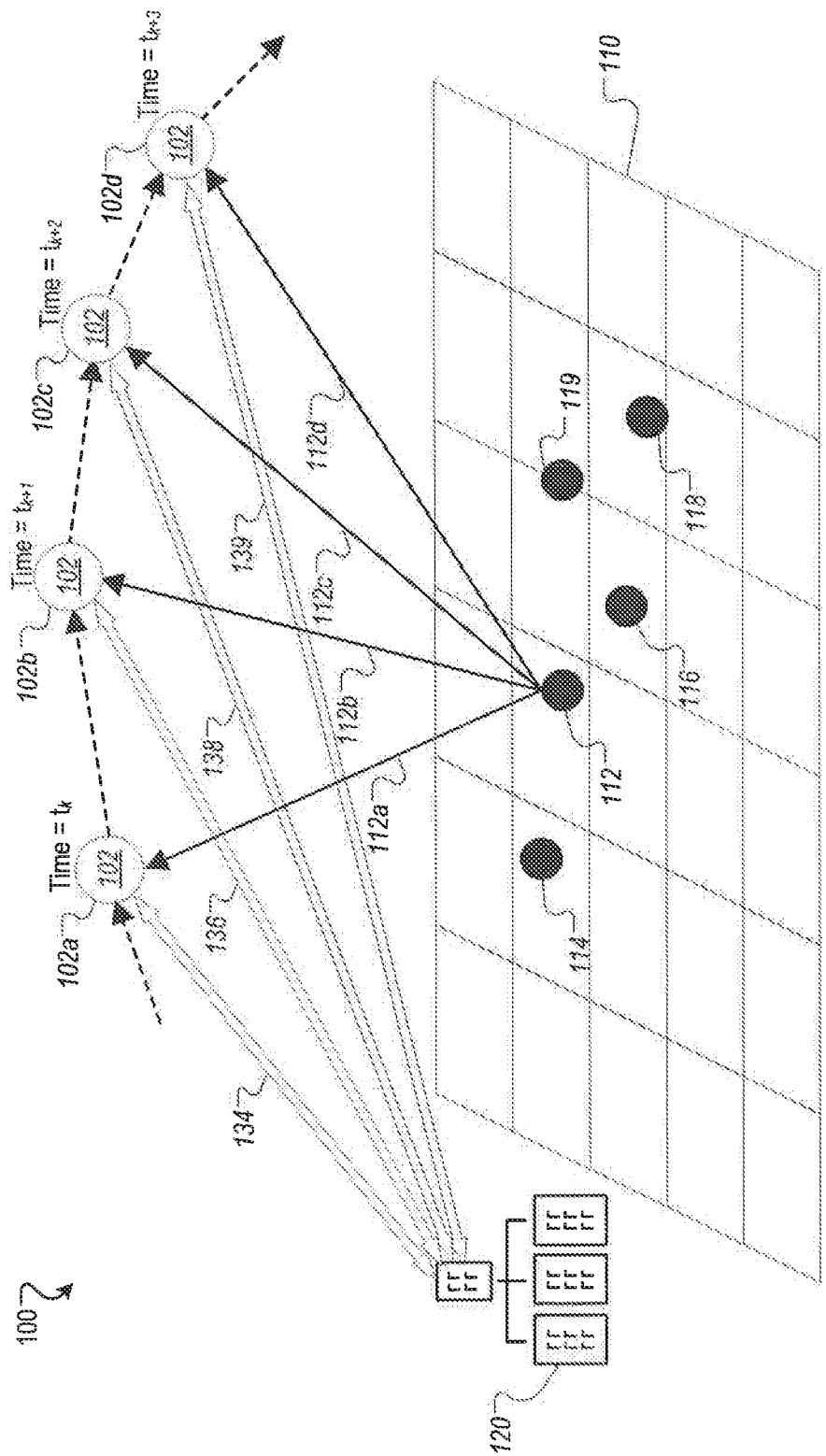
FIG. 1 illustrates an example of a system for determining emitter locations, according to one or more implementations.

Radio geolocation, also referred to simply as geolocation, refers to operations to locate a radio emitter based on analyzing signals emitted by the radio emitter. Geolocation is useful for radio spectrum access enforcement, commercial radio use analytics, and security applications where determination of the location of an emitter sending radio signals is important. In some cases, locations of radio emitters are determined using one or more of time of arrival, frequency of arrival, time-difference and frequency-difference of arrival combined with reverse trilateration. These techniques are based on knowing certain characteristics about the underlying signal transmitted from an emitter, and tagging or correlating a unique time instant for a set of signals that can be used in calculations. However, for situations where the signal is very weak, e.g., below the noise floor and/or with strong co-channel interference from many other spatially distinct emitters on the same frequency, the above approaches may not provide sufficient processing gain to accurately estimate radio emitter locations for many applications.

As described in more detail below, in some implementations, techniques, referred to as Patterned Blind Coherent Integration (PBCI) techniques, are used to determine emitter locations in situations where the signals from the emitters are weak. In this context, the described PBCI techniques involve performing coherent integration of a known radio signal propagation path by estimating candidate locations of the source of the radio signal. In some implementations, the PBCI techniques described herein are used to accurately predict the time delay due to propagation distance that is associated with signals from an emitter being detected, and the Doppler frequency offset trajectories due to relative motion of locations on the ground throughout a period of time during some sensing device flight or overpass corresponding to the location of the emitter. By coherently integrating the signals received at the sensing device, with these delays and Doppler offset effects from the real radio channel inverted and removed from predicted estimates, only signals from a specific target spot on the ground add coherently (indicating the inverted channel effects of the candidate location, e.g., application of a channel response that inverts and removes non-random channel response effects associated with propagation of the target signal, is the right one), while other locations cancel over time due to non-coherent addition of random delay and phase response from multiple sensors.

Specifically, as used in this document, PBCI represents a geolocation technique that leverages stable patterned signal information transmitted from a radio emitter along with specific (or precise) knowledge of the trajectory of a sensing device to establish a specific (or precise) location estimate of the emitter or multiple emitters. PBCI is used to obtain location estimates based on measurements from a single sensor or sensing device. PBCI uses knowledge about the patterned nature of the emitter's signal. In some implementations, PBCI also uses clocks (e.g., system clocks) that are stable in time and frequency and that are configured to have a predefined precision attribute.

In PBCI, knowledge of a pattern in a signal from an emitter allows for multiple independent measurements of offsets (e.g., time offsets or frequency offsets) to the signal by a single sensor to synthetically form the effect of reading signals by multiple sensors. The PBCI technique provides for improved performance relative to other geolocation techniques by observing a known emitter on the ground to obtain a more accurate estimate of parameters describing the sensor trajectory. Algorithms developed in the PBCI approach work by maximizing a probability of obtaining precise observations about the emitter signals given the estimates of the location of the emitter and the position and velocity of the sensing device (e.g., installed on a moving spacecraft) as the signal is observed. When signal structure information about emitter signals of interest for mapping are known, using the known patterns with the PBCI technique enables dispensing with additional (e.g., two or more) or extraneous sensors that are commonly used in current geolocation methods.

In this manner, the PBCI techniques described herein can be used to perform general mapping and geolocation of coherent radio energy transmitted or emitted by an emitter. As indicated above, the PBCI techniques enable determining geolocation of radio signals of unknown or hard to predict structures, such as communications radios, emergency safety beacons, radar emissions, or other radio emitters. In some implementations, a target emitter that is being detected corresponds to a stable location on earth, e.g., the emitter is stationary or is slowly moving relative to the movement of a sensor that detects radio signals from the emitter.

FIG. 1 illustrates an example of a system 100 for determining emitter locations, according to one or more implementations. The system 100 includes a sensing device 102, an area 110 that includes a plurality of emitters that are indicated by candidate emitter locations 112, 114, 116, 118 and 119, and a receiver station 120.

In some implementations, the sensing device 102 is a mobile apparatus, such as spacecraft, aerial vehicles, terrestrial vehicles, or some or suitable mobile platforms capable of movement along a predefined trajectory. For example, the sensing device 102 is a satellite in some implementations. Alternatively, the sensing device 102 can be a car or truck, or a sensing device installed on the car or truck. Alternatively, the sensing device 102 is (or installed on) an aerial vehicle such as an airplane, or unmanned aerial vehicle (UAV) such as a drone or a balloon. Sensing device 102 generally includes hardware, software and processing logic to detect and record radio signals emitted by signal emitters at emitter locations 112, 114, 116, 118, and 119. For example, the sensing device 102 is a radio signal receiver in some implementations. In general, a distance between the sensing device 102 and the emitters of area 110 varies due to movement of the sensing platform that includes the sensing device 102.

The sensing device 102 includes one or more radio signal receivers, also referred to as sensors, which are configured to receive radio signals from emitters. In some implementations, the sensors correspond to radio frequency (RF) antennas coupled to transponders and/or network interfaces on board the sensing device. The sensing device 102 also includes other hardware components, such as a digitizer (e.g., an analog to digital converter, or ADC) that converts the received analog radio signals to a digital format, one or more processors, and memory that stores instructions corresponding to operations performed by the sensing device, and also stores the radio signal data and/or processed information generated based on the radio signal data.

Although a single sensing device 102 is shown, in some implementations the system 100 includes a different number of sensing devices. For example, the system 100 can include two, three, or any other suitable number of sensing devices.

In such implementations, different pairwise emissions can be compared between versions of delays and sensor instances for computing distance metrics and evaluating candidate locations. For example, the system 100 can pairwise compare delays within one emitter, the same delay within multiple emitters, or differing delays between multiple emitters. System 100 can be configured such that all or multiple pairwise copies can be evaluated using the techniques described herein for assessing data describing distances, candidates, locations, or combinations of each.

In some implementations, the area 110 is a geographic region on the Earth's surface. In some implementations, the area 110 is a region of space that is proximate to the Earth's surface, e.g., at a height of a few feet to a few tens or hundreds of feet above ground. The emitters corresponding to the candidate locations 112, 114, 116, 118 and 119 include one or more of emergency safety beacons, radars, television broadcast towers, wireless access points, wireless transmitters, cellular towers, cellular phones, and satellite phones, among other radio emitters. In some implementations, different emitters corresponding to the candidate locations 112, 114, 116, 118 and 119 are of different types. In other implementations, the emitters corresponding to the candidate locations 112, 114, 116, 118 and 119 are of the same type. Each emitter includes hardware, such as one or more communications radios, which transmit radio signals that can be received by other devices, such as the sensing device 102.

The sensing device 102 is mobile and includes a sensor that moves relative to the earth's surface. In some implementations, the sensor moves along a precisely known path, movement trajectory, or orbit. FIG. 1 illustrates an example of system 100 in which a sensing device 102 is moving along a defined orbit. The sensing device 102 detects signal emissions from an emitter on the ground at the various locations of area 110 during movement along an orbital path. This well-modeled or measured trajectory information facilitates the computation of how such motion path affects the time and frequency offsets of patterned emissions received during the motion.

Using the PBCI techniques, a certain pattern within a radio signal of interest can be presumed in some cases. For example, in some implementations, a predetermined pattern of a radio signal emitted by an emitter at candidate location 112 is present in each of a first information or a second information.

The first and/or second information can include attributes or characteristics of the patterned nature of a radio signal transmitted by an emitter at a candidate location. In some implementations, knowledge of a pattern in a radio signal can be obtained from prior knowledge of the pattern from an example standards document, by manual observation of the radio signal of interest, or based on other physical reasons to believe that the pattern may be occurring in the emitted radio signal of interest. In this context, a pattern can refer to a certain information sequence that repeats with a known periodicity. For example, for a time interval N and a known time-offset O, a pattern of a radio signal can be represented by $s(t \ldots t+N)=s(t+O \ldots t+O+N)$ at the transmitter/emitter, where $s(t)$ refers to a signal at time t. This indicates that the emitter transmits the same emission or radio signal multiple times with a well-known or predetermined time and/or frequency offset between emissions. In this equation for representing the pattern information, the offset is "O" time units such as microseconds. Accordingly, a single sensor of system 100 can get multiple looks at a signal of interest with these particular predetermined or known pattern characteristics.

Depending on the type of the sensing device 102, the movement of the sensing device is in space in some implementations, or on the terrestrial surface in some other implementations. In implementations where the sensing device 102 is an aerial platform, the sensing device follows one or more trajectories through space. For example, the sensing device can be a satellite that follows an orbital trajectory with respect to the Earth's surface. Alternatively, in implementations where the sensing device is a terrestrial vehicle, the sensing device follows a trajectory on the ground. For example, the sensing device can be a car or a truck that travels on the Earth's surface, either along marked roads or on unmarked areas. As another example, the sensing device can be a boat or a ship that travels on water, such as the oceans.

During movement of the sensing device 102 along its trajectory, the sensing device receives radio signals from one or more emitters located at one or more of the candidate locations 112, 114, 116, 118 and 119. For example, during a known time interval, the sensing device 102 receives radio signals 112a, 112b, 112c, and 112d from an emitter at candidate location 112 at respective time intervals $t_k$, $t_{k+1}$, $t_{k+2}$ and $t_{k+3}$ when the sensing device 102 is at a respective location in its location 102a-102d. As shown at FIG. 1, the sensing device 102 receives radio signal 112a from the emitter at the candidate location 112 when the sensing device 102 is at a first location in its location 102a during the time interval $t_k$ and subsequently receives radio signal 112b from the emitter at the candidate location 112 when the sensing device 102 is at a second location in its location 102b during the time interval $t_{k+1}$. The sensing device 102 receives radio signal 112c from the emitter at the candidate location 112 when the sensing device 102 is at a third location in its location 102c during the time interval $t_{k+2}$, and subsequently receives radio signal 112d from the emitter at the candidate location 112 when the sensing device 102 is at a fourth location in its location 102d during the time interval $t_{k+3}$.

In some implementations, one of the radio signals 112a or 112b is same as one of the radio signals 112c or 112d. For example, a signal emitted by the emitter at the candidate location 112 at a time instant and received by the sensing device 102 can be referred to as the radio signal 112a. Additionally or alternatively, a signal emitted by the emitter at the candidate location 112 at a second time instant and received by the sensing device 102 can be referred to as the radio signal 112b.

Time delay and Doppler frequency offset trajectories are computed for the sensing device 102 based on the received signals along the paths to specific candidate spots in the area 110. In this context, time delay is due to the propagation of electromagnetic waves through free space as they travel between an emitter and a receiving sensor. The Doppler frequency offset refers to the translation of the center frequency of a signal due to relative velocity differences between the signal emitter and the sensor receiving the signal. By computing the time delay and Doppler frequency offset trajectories from the known paths of the sensing device, signals arriving from a particular location can be coherently added. For example, time delay and Doppler frequency offset trajectories are computed for the sensing device 102 based on its known location. Following computation of the time delay and Doppler frequency offset trajectories for the sensing device 102, the signals from the emitter at the candidate location 112 that are received at the sensing device 102 (e.g., on one or more of the radio signals 112a, 112b, 112c, and 112d) are coherently added.

In this manner, by summing received signals with the inverted channel for a candidate location (e.g., 112) applied over multiple signal receptions by a single sensing device, signals add coherently corresponding to candidate locations that are emitting energy, which is manifested by the corresponding emitter signal. However, for candidate locations that are not emitting energy, the signals add incoherently and cancel on average due to random Doppler and delay profile cancellations.

As noted above, in some implementations, the sensing device 102 is a satellite. In such cases, the satellite can be a low earth orbit (LEO) satellite, a medium earth orbit (MEO) satellite, or a geosynchronous orbit (GEO) satellite. In some implementations, radio signals that are received at the sensing device 102 from a plurality of candidate emitter locations (e.g., from emitters corresponding to the candidate locations 112, 114, 116, 118 and 119) are integrated over a long coherent time interval to obtain an energy surface spanning a candidate grid.

Figure 2A:
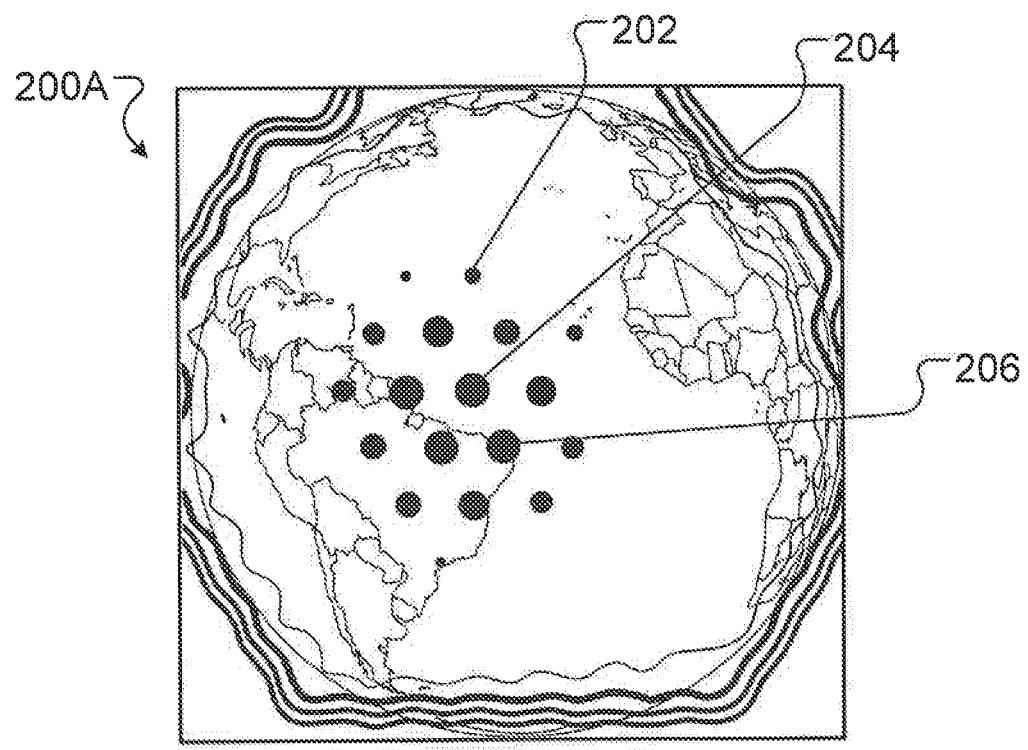
FIGS. 2A and 2B illustrate examples of energy surfaces over known areas, according to one or more implementations.
Figure 2B:
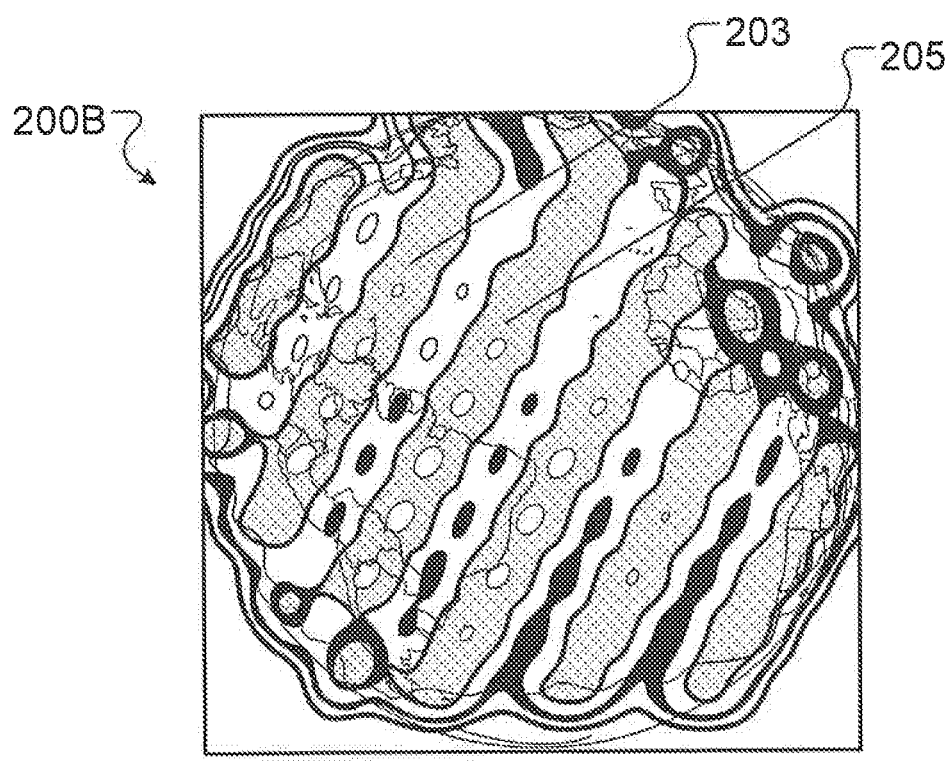

FIGS. 2A and 2B illustrate examples of energy surfaces 200A and 200B respectively over known areas, according to one or more implementations. Each energy surface highlights locations in a given area (for example, the area 110) that are emitting energy at one or more specific frequencies. For example, the energy surface 200A shows locations 202, 204 and 206, among others, that are emitting energy. The energy surface 200A is used to map the locations of one or more unknown emitters of unknown signals, based on determining locations where the radio signals, which are received at sensing device 102 as described previously, add coherently. For example, one or more of the locations 202, 204 and 206 correspond to locations of emitters in the area of interest (e.g., one or more of the locations 202, 204 and 206 can map to locations of one or more of the emitters corresponding to the candidate locations 112, 114 and 116 in the area 110).

In some implementations, a specific track, Doppler, signal or sensing device profile has a given autocorrelation in space, time and frequency, which is a measure that determines accuracy in estimates of each of space, time and frequency variables to obtain a significant distance metric (e.g., the autocorrelation is a measure of how wide the energy is spread out in time, frequency, and space within the search grid), and can require various grid sampling densities to accurately sample the space or area that include emitters. For example, a first signal with a strong autocorrelation in space can be sampled using a lower grid sampling density (e.g., sensing the first signal using a sensing device, e.g., sensing device 102, at a lower number of points in space, and/or at more widely spaced points in space) compared to a second signal with a relatively weaker autocorrelation in space. For the second signal, a higher grid sampling density may be used, such as sensing the second signal using a sensing device, e.g., sensing device 102, at a higher number of points in space, and/or at more closely spaced points in space, compared to the case for the first signal.

In some implementations, a search strategy is employed to determine the location of the emitters. Initially a coarse wide area grid search is performed over the area of interest. Once a sub-area is identified corresponding to the target location, then a more refined search is performed over the more sub-area. In the coarse wide area search, the sensing device, e.g., sensing device 102, operates to sense signals at a limited first number of locations along its trajectory. In the refined search, the sensing device operates to sense signals at a second number of locations along its trajectory, where the second number of locations is greater than the first number of locations. For example, a wide search can be in a 100×100 square mile grid, searching in increments of 10×10 square meters or 100×100 square meters; while a refined search can be in a 0.5×0.5 square mile grid, searching in increments of 0.1×0.1 square meters.

In some implementations, the first number of locations and the second number of locations are preselected, e.g., determined by an administrator or operator monitoring the search functions. In some implementations, the locations along a trajectory at which a sensing device operates to sense signals are stored in memory coupled to the sensing device. One or more processors on board the sensing device, e.g., sensing device 102, execute instructions stored in the memory to perform the sensing function, e.g., monitor, receive and process signals, when the movement trajectory of the sensing device places it at one of the preselected locations along its trajectory. The instructions enable the sensing device to perform the coarse area search, e.g., sensing at the first number of locations, and/or the refined search, e.g., sensing at the second number of locations.

For example, a first search can be performed over the area represented by the energy surface 200A. One or more sub-regions, e.g., 203 and 205 as shown in the energy surface 200B, are identified based on the first search, and a second, more fine-grained search is performed in these sub-regions. The granularity of each grid location considered in the second search is higher (e.g., each grid location is smaller or more fine grained) compared to that in the first search. Accordingly, a sensing device senses signals at a greater number of locations in the second search compared to the number of locations in the first search. As an illustrative example, when locating a radio beacon at sea, a single sensing device, e.g., sensing device 102, is operated to initially perform a coarse search over a wide area of the sea to determine candidate locations. Subsequently, the sensing device is operated to perform a fine-grained search over a smaller region of the sea that corresponds to one or more locations or sub-regions identified in the initial search as candidates for the location of the radio beacon.

In some implementations, a search strategy that is used depends on the density of emitter locations. For sparsely populated areas (e.g., few candidate locations and/or widely separated candidate locations), a first search strategy is used where each grid location in the area considered has a first dimension. For densely populated areas (e.g., large number of candidate locations and/or closely-spaced candidate locations), a second search strategy is used where each grid location in the area considered has a second dimension that is smaller than the first dimension, such that the second search is more fine grained or high resolution compared to the first search. For example, the energy surface 200A may represent a sparsely populated area that is searched using a coarse search strategy. In contrast, the energy surface 200B may represent a densely populated area that is searched using a fine-grained search strategy. As an illustrative example, a coarse search strategy can be used to measure cellular spectrum occupancy and usage density in sparsely populated rural areas, but a fine grained search strategy can be used in more densely populated urban areas, or to cover with greater precision targeted areas that are of interest to spectrum enforcement agencies.

The energy surfaces have distinct energy peaks in desired emitter and sensing device dynamics scenarios. An energy peak indicates a high level of confidence in the estimate of the emitter location. The error bounds in the search strategies are characterized to be robust in the configurations of interest through measurement. Robustness in the error bounds indicate that location estimates for the emitters corresponding to the signals of interest can be obtained with high confidence.

In some implementations, one or more of the various PBCI computations and searches, e.g., involving computations of the time delay and Doppler frequency offset trajectories for a sensing device that is receiving the emitter signals, coherent integration of radio signals to generate energy estimates and energy surface grids, and searches over the energy surfaces, are performed in a single sensing device. For example, the sensing device 102 performs the various computations and searches in some implementations. In other implementations, sensing device 102 interacts with and uses receiver station 120 to perform at least a subset of the various computations and searches. In such cases, the radio signals received at the sensing device 102 from the various emitters are transmitted to the receiver station 120 from the sensing device 102.

For example, in some implementations, the sensing device 102 sends, over a communications link 134 established between the sensing device 102 and receiver station 120, the radio signals that are received at the sensing device 102 from various emitters, such as the radio signal 112a received from the emitter at the candidate location 112. Communication links can be established for exchanging data between the sensing device 102 and receive station 120 when the sensing device 102 is at a respective location along its movement trajectory. For example, a communications link 134 is established between the sensing device 102 and the receiver station 120 at location 102a and for a corresponding time=$t_k$, while a communications link 136 is established between the sensing device 102 and the receiver station 120 at location 102b and for a corresponding time=$t_{k+1}$. Likewise, a communications link 138 is established between the sensing device 102 and the receiver station 120 at location 102c and for a corresponding time=$t_{k+2}$, while a communications link 139 is established between the sensing device 102 and the receiver station 120 at location 102d and for a corresponding time=$t_{k+3}$. In such implementations, a sensing device that manages performing the computations, e.g., sensing device 102, controls and/or monitors the operations performed by the receiver station 120. For example, the sensing device 102 sends instructions to the receiver station 120, to control performing the computations associated with the described PBCI technique. In some implementations, the system 100 uses the receiver station 120 to perform all, or some, of the computations associated with the described PBCI technique. For example, sensing device 102 can use one or more of the communications links 134, 136, 138, and 139 to provide control signals for controlling the receiver stations 120 and to exchange data communications relating to the performing the computations. Alternatively, in some implementations, instructions for performing computations at the sensing device 102 are uploaded to the sensing device 102, and/or updated at particular time instants and re-uploaded, from the receiver station 120.

As described in greater detail in the following sections, in some implementations, the various PBCI computations and searches are performed upon determining that the internal or system clock of the sensing device is synchronized with a reference clock that provides a reference clock signal. The reference clock signal can be one of a Global Navigation Satellite System (GNSS) signal or a Global Positioning System (GPS) signal. Alternatively, the reference clock signal can be sent by the sensing device 102 to the receiver station 120, or to one or more other sensing devices, or both. For example, the reference clock signal can correspond to the system clock of the sensing device 102. In this manner, the system clock(s) of the one or more other sensing devices or the receiver station 120 used in the PBCI computations are synchronized with the clock of the sensing device 102 that manages performing the computations. In some implementations, synchronizing the system clocks allows the system 100 to know to a high degree of accuracy when emitter signals arrive at the sensing device along multiple paths along the trajectory of the sensing device 102. This knowledge can affect the spatial resolution or error precision in the estimation of the emitter location.

In some implementations, the sensing device 102 manages performing the PBCI computations within system 100 and the receiver station 120 performs at least a portion of the computations using data received from the sensing device 102. For example, the sensing device 102 causes the computations to be performed and/or initiates searches upon determining a change in clock state or upon information triggering the reception of a ground emission (e.g., from emitter locations 112, 116, etc.). Subsequently, the sensing device 102 processes the received emitter signals and performs the coherent computations. For example, the sensing device 102 performs the coherent computations, such as computing distances between emissions, estimating candidate location, times or offsets, or compressing emission data, and may also use the receiver station 120 to perform at least a subset or portion of the coherent computations. In some implementations, the sensing device 102 processes the received emitter signals using the receiver station 120.

In some cases, performing the computations on sensing device 102 reduces the need for downlink communications channel spectrum (e.g., to the receiver station 120), and increases the capacity of the system 100 in terms of number of searches per pass (e.g., per trajectory movement of the sensing device over the area 110), number of searches per day, or number of searches per fixed downlink quantity, among others.

In some implementations, one or more of the various PBCI computations and searches noted above are performed in the receiver station 120. The receiver station 120 includes a gateway with RF transponders, which receives signals from the sensing device 102 in some implementations. For example, when the sensing device is a spacecraft, the receiver station 120 can include a terrestrial satellite gateway that communicates with the spacecraft. In some implementations, the sensing device 102 forwards to the receiver station 120 the radio signal information that are received at the sensing device from the emitters using established communications links, as described above. For example, as indicated above, a communications link 134 is established between the sensing device 102 and the receiver station 120 along a movement trajectory that includes location 102a, while a communications link 136 is established between the sensing device 102 and the receiver station 120 along a movement trajectory that includes location 102b. Further, a communications link 138 is established between the sensing device 102 and the receiver station 120 along a movement trajectory that includes location 102c, while a communications link 139 is established between the sensing device 102 and the receiver station 120 along a movement trajectory that includes location 102d.

The sensing device 102 sends to the receiver station 120, over the communications link 134 and 136, the radio signals that are received at the sensing device 102 from various emitters, such as the respective radio signals 112a and 112b received from the emitter at the candidate location 112. Similarly, the sensing device 102 sends to the receiver station 120, over the communications link 138 and 139, the radio signals that are received at the sensing device 102 from various emitters, such as the respective radio signals 112c and 112d received from the emitter at the candidate location 112. In such implementations, the receiver station 120 controls and/or monitors the operations performed by the sensing device. For example, the receiver station 120 sends instructions to the sensing device 102 to control the movement of the sensing device along its trajectory, to operate its sensors to receive signals from ground emitters, and/or to send the received signals to the receiver station 120 at preselected time intervals. The instructions sent from the receiver station 120 control at what locations along the respective trajectories (e.g., at locations 102a, 102b, 102c or 102d for sensing device 102) the sensing device operates its corresponding sensors to receive the emitter signals. As described previously, the locations can be a first number of locations for a coarse search and/or a second number of locations for a refined search.

The receiver station 120 can perform the various computations and searches based on receiving the information from the sensing device 102. In some implementations, operations corresponding to the PBCI techniques are performed at the receiver station 120 within a datacenter environment. The techniques can be executed at the site of the receiver station 120, or forwarded (e.g., through a dedicated physical communications link or over an Internet connection) to a datacenter that is connected to the receiver station 120.

In a manner similar to that described above, in some implementations, the receiver station 120 performs the various PBCI computations and searches upon determining that the system clock of the sensing device 102 is synchronized with a reference clock signal, with which the system clock of the receiver station 120 is also synchronized. For example, the receiver station 120 sends instructions to the sensing device 102 to synchronize the system clock of the receiver station 120 with a reference clock signal. The reference signal can be one of a Global Navigation Satellite System (GNSS) signal or a Global Positioning System (GPS) signal. Alternatively, the reference clock signal can be sent by the receiver station 120 to the sensing device 102. For example, the reference clock signal can correspond to the system clock of the receiver station 120. In some implementations, the sensing device 102 includes a single system clock and the receiving station 120 includes a single system clock. In other implementations, the sensing device 102 includes one or more system clocks, or the receiving station 120 includes one or more system clocks, or both.

In some implementations, the receiver station 120 performs the computations and/or initiates coarse or refined searches using the sensing device 102 upon determining that the system clock of the sensing device 102 is synchronized (e.g., with the reference signal and/or with one another). For example, the receiver station 120 receives acknowledgement signals from the sensing device 102 which indicate that the system clock of the sensing device is successfully synchronized with the reference signal. Subsequently, the receiver station 120 processes the emitter signals read by the sensing device 102 and performs the computations for the PBCI techniques.

In some implementations, the combination of the sensing device 102 and the receiver station 120, perform the various PBCI computations and searches noted above. For example, in some implementations, the sensing device determines the time delay and Doppler frequency offset trajectories, while the receiver station performs the coherent integration of radio signals, energy surface generation, and search functions over areas of interest. Other suitable work distributions are also possible. The following section describes the various operations that are performed. It is to be understood that the operations can all be performed in the sensing device 102, at the receiver station 120, or by a suitable combination of both.

An emitter, e.g., corresponding to the candidate location 112, emits a radio signal represented by the time series s(t). When received by sensor radios $r_i$ (e.g., by the sensors aboard the sensing device 102) along differing tracks x, y, z(i, t) (e.g., 102a and/or 102b), the signal s(t) undergoes a time varying time delay function and a time varying frequency offset function that is characterized by the distance of the path between the candidate location x, y, z(j, t) (e.g., candidate location 112 in the area 110) and the position x, y, z(i, t) of a sensing device, and the relative motion of the emitter and the sensing device. For each combination i, j, a delay function delay(i, j, t) and a Doppler offset function dop(i, j, t) are spatially obtained, e.g., by computing the propagation rate and differential velocity measure of the signal through free space or other medium given the known location trajectories over time. The delay function and the Doppler offset function are inverted, e.g., by advancing time according to the prior delay profile, to obtain corresponding inverse functions $\text{delay}^{-1}(i, j, t)$ and $\text{dop}^{-1}(i, j, t)$ respectively. In some implementations, the delay and Doppler offset functions are obtained in units of Hertz (Hz).

In some implementations, the inverse operations are performed to remove one or more of propagation delay, dilation and rotation. The inverse function estimates, which are also referred to as inverted channels, are generated based on predictions of emitter locations and information about the known trajectories of the sensing device, as given by equation (1).

$$\text{Inverted channel} = \hat{H}^{-1}(i,j,t) \quad (1)$$

In equation (1), the inverted channel for the sensing device i (e.g., sensing device 102) is computed based on a signal transmitted from candidate location j and received by the sensing device i at time t.

Received signal estimates of $\hat{s}_{i,j}(t)$ are obtained (where $\hat{s}_{i,j}(t)$ is the estimate for a signal transmitted from a candidate location j and received by a sensing device i at time t) for a given emitter location (e.g., candidate location 112) and a given sensing device 102 by applying the delay and Doppler functions to the received signal through a time interpolation/re-sampling (e.g., to advance the signal in time by an amount that is equivalent to an amount by which the signal was delayed during propagation at each instant) and a shifting process as well as by mixing with a local digital oscillator. In this context, mixing with a local digital oscillator is performed by running an oscillator at the negative frequency of the Doppler offset at each instant based on propagation. The resulting complex value is multiplied by the received signal to obtain the received signal estimate. The signal estimate $\hat{s}_{i,j}(t)$ is based on the estimated inverted channel corresponding to the location j and the sensor i, as shown by equation (2).

$$\hat{s}_{i,j}(t) = \text{conv}(r(i,t), \hat{H}^{-1}(i,j,t)) \quad (2)$$

In equation (2), conv is a convolution function and r(i, t) is a measure of a radio signal received at sensor i at time t.

Once inverted signal estimates are obtained, e.g., using equations (1) and (2) above, a distance metric is used between pairs of the inverted signal estimates to measure or estimate the energy emitted from the candidate location in the target area (e.g., area 110), which is given by equation (3). The coherent arrival of an unknown radio signal through an inverted channel, as determined using equations (1) and (2), at a single sensor (or multiple discrete sensors of the single sensing device 102) is used to evaluate a distance metric, as given by equation (3). The distance metric is used to score the different locations on the ground for similarity of the estimated radio signals transmitted by the emitters.

$$E_j = D(\hat{s}_{i_0,j}, \hat{s}_{i_1,j}) \quad (3)$$

In equation (3), $\hat{s}_{i_0,j}$ is the estimate of signal strength corresponding to a radio signal that is received from candidate emitter location j (e.g., candidate location 112) at the sensing device i (e.g., 102) at a first location (e.g., location 102a at time $t=t_k$) along its movement trajectory, while $\hat{s}_{i_1,j}$ is the estimate of signal strength corresponding to a radio signal that is received from candidate emitter location j at the sensing device i at a second location (e.g., location 102b at time $t=t_{k+1}$) along its movement trajectory. Ej is the estimate of energy (e.g., in Joules) at the candidate emitter location j while D is a distance metric that is employed to obtain the estimate. An energy estimate can be computed for each pairwise set of distance metrics obtained at sensing device 102, as shown by equation (3).

In some implementations, a pairwise set of distance metrics includes distance metrics computed for respective locations (e.g., 102a, 102b) along a movement trajectory of sensing device 102. In some instances, different sensors on sensing device 102 may be involved with detecting, receiving, and/or processing the radio signals for determining the signal strength and energy estimations.

Detected signals from the emitter can include a known signal pattern information which, along with the known trajectory (and locations) of the sensing device 102 and the times (e.g., $t_k$) of detection, facilitate determination of the location of the signal emitter using PBCI, as described in more detail below. In some implementations, for the sensing device 102 to obtain multiple reads of the signal of interest, an accurate system clock(s) is presumed to control the sensing device 102. Otherwise, system clock inaccuracy can increase an error term with regard to accurately measuring the time offset O and corresponding distances traveled by the patterned emissions from the emitter(s) of candidate location 112, or other candidate locations. Accordingly, in some implementations, determining that the known pattern is present in each of the first information and the second information includes determining that a system clock corresponding to the operation of the sensing device 102 has an accuracy within a pre-selected threshold accuracy value. For example, an absolute time reference error under 10 microseconds (μs) and a clock stability of 50 parts per billion can represent threshold accuracy values for achieving a certain error tolerance on the estimated time and distance offsets, and thereby confidence in candidate locations. In other instances, higher (e.g., 40 μs) or lower (e.g., 5 μs) absolute time references or clock stability metrics may be used.

The process of measuring a signal of interest multiple times can involve using equations that are similar to difference of arrival equations, but that accept as parameters, measurements from a single sensor 102 measured at different times that correspond to respective locations of a trajectory of the sensing device. In some implementations, this process corresponds to making an aperture (e.g., a large aperture) based on motion and a known or patterned radio signal data being emitted from a ground emitter The disclosed approach of using multiple measurements from a single sensing device 102 removes the need for using more than one sensing device, and thus reduces system cost.

In some implementations, a maximum a posteriori technique used to estimate emitter location utilizes special-purpose computing hardware (e.g., computationally advanced computing hardware). In some implementations, the disclosed techniques allow the computing hardware, which implements processes corresponding to the technique, to leverage concurrent processing to evaluate a fit of several (or all) candidate input scenarios. These techniques and processes enable efficient use of the resources of the computing hardware, while also providing accurate results.

Obtaining a prediction of the candidate location 112 involves using the described maximum a posteriori technique to compute metrics or other parameter values for predicting accurate emitter locations. For example, the disclosed maximum a posteriori technique is used to compute or obtain a set of candidate locations on the ground, $x_j$, which represent predicted places that may be emitting the radio signal(s) of interest. In some implementations, in order to measure a likelihood of these signals coming from each location, a distance metric for each candidate location is computed. The distance metric computes the likelihood that a signal with a given known or predetermined patterned property has been emitted from the candidate location. For a signal that repeats at an offset O, a distance metric can be computed as: $D (\hat{H}^{-1}(x_j)(s(t, \ldots, t+N)), \hat{H}^{-1}(x_j) (s(t+O, \ldots, t+O+N))$.

For example, the maximum a posteriori technique computes a version of the received signal r(t) and can be used to invert the channel corresponding to the candidate location $(x_i) \rightarrow \hat{H}^{-1}(x_i)$ to remove effects of the determined delay and the determined Doppler corresponding to the candidate location. In some implementations, obtaining the predications of the candidate location 112 is performed using the first and second locations of the sensing device 102 that are determined based on the obtained knowledge of the movement trajectory of the sensing device 102. The distance between each pair of the repeating patterned versions of the signal can be computed under these assumptions. For a good or accurate candidate location estimate, low distance metrics are obtained, as the inverted channel should result in close or substantially close signals (plus noise) for each pair. In some implementations, a "low" or "good" distance metric indicates similarity, or substantial similarity, between signals at a specific offset. These distance metrics can be typically measured in a relative sense to the other estimated distances, but may also be measured in absolute terms. As an example, a distance metric can be a power level of a difference signal between first and second candidate signals, which could be measured in dBm (decibel-milliwatts). The power level difference signal may decrease, in some implementations, from −80 dBm to −100 dBm, indicating an emission from a candidate location. For bad or less accurate candidate locations, the distance increases, as differing delay, Doppler, and dilation effects will lead to larger distance metrics. These effects occur because the signals of interest add non-coherently and result in noise for less accurate candidate locations, but add coherently and result in large magnitudes at more accurate candidate locations. In some implementations, the maximum a posteriori techniques are used by maximizing the probability of the observations, given the estimates $x_j$.

In some implementations, the distance metric D is an L2 error distance between signals, which is given by $D_{L2}(S_0(t), S_1(t))=\int_t(S_0(t)-S_1(t))^2$, where $S_0(t)=\hat{s}_{i_0,j}$ and $S_1(t)=\hat{s}_{i_1,j}$. In some implementations, the distance metric D is an LN error distance between signals, which is given by $D_{LN}(S_0(t), S_1(t))=\int_t(S_0(t)-S_1(t))^N$. In some implementations, the distance metric D is a complex cross power distance between signals, which is given by $D_{cp}(S_0(t), S_1(t))=Abs(\int_t S_0(t)*conj(S_1(t)))$, or given by $D_{cp}(S_0(t), S_1(t))=\int_t real(S_0(t)*conj(S_1(t)))$, where $S0(t)=\hat{s}_{i_0,j}$ and $S1(t)=\hat{s}_{i_1,j}$. Other distance metrics can also be used, e.g., depending on power, interference, and signal structure scenarios. Some distance metrics are better in single emitter environments (e.g., a sparsely populated area that includes one or few emitters) and some are better in dense emitter environments, depending on the constructive addition of the power of the target emitter, and how the estimates non-coherently effect the noise from non-target emitters.

Accordingly, in some implementations, depending on the nature of the environment in which the candidate emitter locations are searched, different distance metrics are employed. For example, a sensing device or the receiver station 120, depending on the entity controlling the search and/or performs the computations, selects a particular distance metric for the PBCI computations based on determining the environment in which the emitter candidate location is present. In some implementations, upon receiving the signals collected by the sensing device, the receiver station 120 (or a sensing device performing the computations, e.g., 102, depending on the implementation), determines that the environment is a sparsely populated area, or a dense emitter environment, e.g., based on the number of signal measurements received from the sensing device, and/or based on prior knowledge about the area under measurement (such as area 110).

If the receiver station 120 determines that the area is sparsely populated, the receiver station 120 selects a first distance metric. On the other hand, if the receiver station 120 determines that the area is densely populated, the receiver station 120 selects a second distance metric that is different from the first distance metric. For example, in the case of multiple interferers, certain distance metrics which do not amplify interference noise are preferred. However, in some other implementations, the same distance metric is used irrespective of the environment. In this context, examples of multiple interferers include, in some implementations, cell towers spaced every few miles apart and transmitting on the same channel. Examples of single interferers include, in some implementations, a ship with a radio in the middle of an ocean or a sea.

In some implementations, a search over an energy surface area is performed following computation of the distance metrics as described above. The search can employ both coarse and fine-grained search strategies, as discussed above. Due to integration of distance metrics over a long time/pass interval, locations of very low energy emitters, e.g., emitters with radio signals in the range of −20 to −40 decibels (dB) signal to noise ratio (SNR) that is received at the sensing device can be determined in the presence of noise. This is useful for mapping of weak terrestrial signals using a single sensing device that is geographically distant from the locations of the signal emitters. For example, the techniques can be used to map cellular, commercial and other emitters for spectrum regulation, mapping and deployment planning purposes. Additionally or alternatively, the techniques can be used to track a company's inventory map emitters with characteristics of interest, among other commercial applications. In some implementations, maps of emitter locations or information about specific emitters can be used as analytics that are computable using the above techniques for dealing with low SNR scenarios.

In some implementations, the above computations and the associated search strategies are performed using one or more processors on board the sensing device (e.g., using computing units at the sensing device 102) or at the receiver station 120. In some implementations, the PBCI techniques provide efficient computations for a large number of candidate emitter locations, and associated searches over large and/or high-density areas, by concurrently evaluating multiple candidate locations. For example, massively parallel graphics processing unit (GPU) architectures, such as Theano or Tensorflow™, are used in some implementations for rapid implementation and deployment, e.g., using a massively concurrent architecture on a GPU hardware. Accordingly, in some implementations, the sensing device 102 or the receiver station 120, or both, include processors with parallel processing architectures, such as one or more massively parallel GPUs. In such implementations, the receiver station 120, or the sensing device 102, or both, employs the on-board parallel processors to perform the computations for the PBCI techniques, e.g., for a large number of candidate emitter locations.

In some implementations, using a great degree of parallelism in the operations renders the computations efficient to run on many cores at lower clock rates for energy efficiency. The PBCI techniques are adapted to achieve gross data parallelism in a number of dimensions, such as candidate location, candidate distance metric, time segmentation, and a number of others. For example, considering the candidate location partitioning, the PBCI techniques achieve gross parallelism by using many-core computers (e.g., both central processing unit (CPU) and GPU) to divide and compute various metrics concurrently. This can include computing the candidate distance metric for each candidate location (or some group of candidate locations) on a separate core independently. Workload can be easily divided by candidate location, by time section, or several other potential partitionings, which can lead to speedups by a factor of hundred or more. In addition to improving the processing efficiency of the sensing device, the energy expenditure of the devices can be reduced, as noted below.

The operations can be further scaled over dense many-core GPU platforms for power and search time efficiency, as well as over large clusters of compute nodes. For example, in some implementations, the instructions for the PBCI computations are customized, e.g., configured to be processed efficiently, using parallel processors. In doing so, the time to perform a single search process can be minimized, and a location estimate can be achieved with minimal latency. Accordingly, in some implementations, the sensing device 102, and/or the receiver station 120, uses massively parallel GPU compute platforms with low size, weight and power that are intended for mobile and power/heat limited applications. For example, the sensing device 102 can use the NVIDIA Tegra™ TX1 computing platform. This is advantageous when the sensing device is a spacecraft or installed on one or more aerial platforms. In such implementations, by using PBCI techniques that can make efficient use of processors and other hardware with features of parallel processing, multiple cores, or both, the amount of energy expended in performing the operations are limited, thereby extending the life of the stored energy for the devices performing the computations. This is particularly useful for spacecraft such as satellites, or aerial platforms such as UAVs, that have limited energy sources (e.g., on-board batteries).

As noted previously, in alternative implementations, the system clock of a sensing device is synchronized with other system clocks of system 100 (e.g., one or more other system clocks at the sensing device or at the receiver station 120). The system clocks are synchronized such that stable inverted delay time and Doppler offset functions can be estimated, and so that estimated signals may be added coherently at sensing device (e.g., using equation (3)) over non-negligible integration times.

In some implementations, the system clock of the sensing device is synchronized based on deriving the system clock from a common reference clock signal, e.g., a Global Navigation Satellite System (GNSS) signal, a Global Positioning System (GPS) signal, or a reference signal sent by the receiver station 120. In some implementations, the reference clock signal can be sent to and from various devices of system 100 over direct radio or optical crosslinks between the devices, such as the communications link 134, 136, 138, or 139 between sensing device 102 and receiver station 120.

As noted above, in some implementations, a number of ground locations from a grid or otherwise is searched to measure the distance metric of the arriving signals at each potential location to generate a geographic map of radio energy. In some implementations, initially a large grid is selected. However, the dimensions of each unit of space, or cell, in the grid is considered at a sufficient spacing granularity to ensure that a measurable distance metric at the expected maximum offset from a grid point (e.g., (maximum distance between points)/2) can be obtained. For example, this includes the half-power spatial distance of the candidate distance metric's spatial auto-correlation function.

Once a coarse location is obtained, another measurement can be performed using a fine grid of points surrounding the best candidate location from the prior search. In this manner, a finer location estimate for the target emitter location can be determined. Additionally, in some implementations, least-squares polynomial function fits or other interpolation methods are used to obtain smooth peak estimates between grid points when finding a peak.

In some implementations, the above computations can be extended from two to three or more respective locations of a single sensing device (e.g., as the device moves along a trajectory) by computing the distance metrics pairwise between each set of adjacent points and combining the distance metrics through some means, for example, multiplicatively, additively, or some other suitable combining metric that scales the distance metrics differently in comparison to each other. For example, in some implementations, the distance metrics are given by one of equations (4) and (5).

$$D(\hat{s}_{i_0,j}, \hat{s}_{i_1,j}, \hat{s}_{i_2,j}) = D(\hat{s}_{i_0,j}, \hat{s}_{i_1,j}) * D(\hat{s}_{i_1,j}, \hat{s}_{i_2,j}) * D(\hat{s}_{i_0,j}, \hat{s}_{i_2,j}) \quad (4)$$

$$D(\hat{s}_{i_0,j}, \hat{s}_{i_1,j}, \hat{s}_{i_2,j}) = D(\hat{s}_{i_0,j}, \hat{s}_{i_1,j}) + D(\hat{s}_{i_1,j}, \hat{s}_{i_2,j}) + D(\hat{s}_{i_0,j}, \hat{s}_{i_2,j}) \quad (5)$$

In equations (4) and (5), $\hat{s}_{i_0,j}$ is the estimate of signal strength corresponding to a radio signal that is received from candidate emitter location j (e.g., candidate location 112) at sensing device i (e.g., sensing device 102) at a first location "0" (e.g., location 102a) along a movement trajectory of the sensing device, $\hat{s}_{i_1,j}$ is the estimate of signal strength corresponding to a radio signal that is received from emitter location j at the sensing device i at a second location "1" (e.g., location 102b) along the movement trajectory of the sensing device, and $\hat{s}_{i_2,j}$ is the estimate of signal strength corresponding to a radio signal that is received from emitter location j at the sensing device i at a third location "2" (e.g., location 102c) along the movement trajectory of the sensing device.

In some implementations, each emitter E emits a continuous or bursty signal $s_i(t)$ on the ground. As discussed throughout this document, this signal undergoes a channel introducing time delay, dilation, and frequency offset based on the distance between the emitter that emits the signal and the sensor of the sensing device 102 that receives the signal. For a known location of the emitter, these channel effects can be computed, but for instances where the emitter location is not known, the described PBCI techniques are used to determine the most likely candidate locations for each emitter $E_i$.

Figure 3:
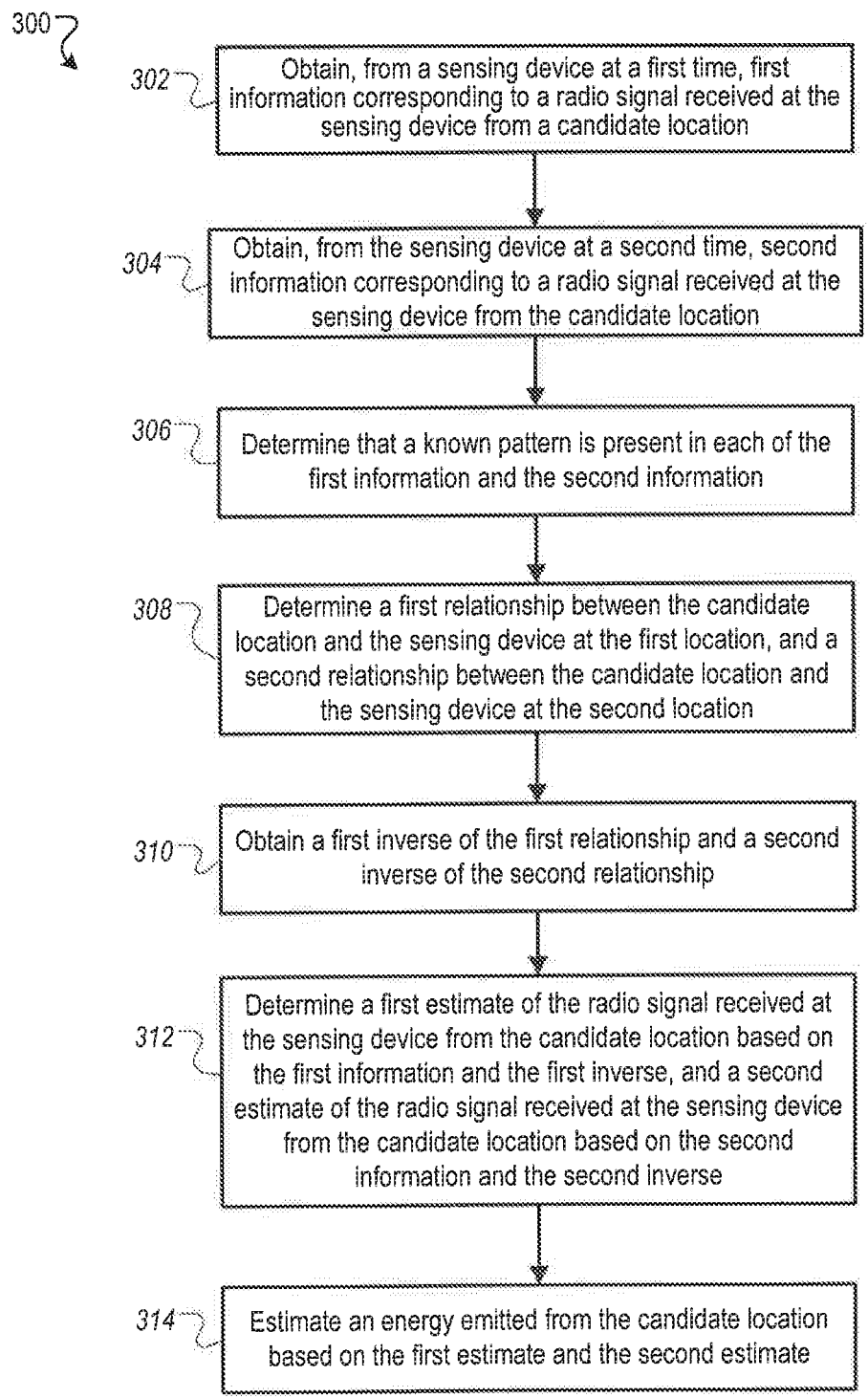
FIG. 3 illustrates an example of a process for estimating or measuring energy emitted from a candidate location in an area, according to one or more implementations.

FIG. 3 illustrates an example of a process 300 for measuring or estimating energy emitted from a candidate location in an area, according to one or more implementations. The process 300 can be performed by components of the system 100. For example, the process 300 can be performed using the sensing device 102, the receiver station 120, or a suitable combination of the sensing device 102 and the receiver station 120 and respective sensors of each component. Accordingly, the following sections describe the process 300 with respect to the system 100. However, the process 300 also can be performed by other suitable devices or systems.

In some implementations, the process 300 is performed by one or more processors associated with the respective device(s) or component(s) performing the process 300. For example, the sensing device 102 can perform the process 300 by executing instructions corresponding to the process 300 that are stored in memory coupled to the sensing device. The instructions are executed by one or more processors coupled to the sensing device. Additionally or alternatively, in some implementations, the receiver station 120 can perform the process 300 by executing instructions corresponding to the process 300 that are stored in memory coupled to the receiver station 120. The instructions are executed by one or more processors coupled to the receiver station 120.

In some implementations, the process 300 is performed by a single sensing device. For example, the process 300 can be performed by the sensing device 102 described above with reference to at least FIG. 1.

At 302, first information corresponding to a radio signal received at a sensing device from a candidate location is obtained from the sensing device at a first time. The sensing device is at a first location in its movement trajectory at the first time. For example, the sensing device 102 receives a radio signal 112a from the emitter corresponding to the candidate location 112 when the sensing device is at location 102a along its trajectory, at time $t=t_k$, and obtains information from the received radio signal 112a. The received radio signal is sent to a processor on board the sensing device 102 in some implementations. The received radio signal is sent to a processor in the receiver station 120 in some implementations.

At 304, second information corresponding to a radio signal received at the sensing device from the candidate location is obtained from the sensing device at a second time. The sensing device is at a second location in its movement trajectory at the second time. For example, the sensing device 102 receives a radio signal 112b from the emitter corresponding to the candidate location 112 when the sensing device is at location 102b along its trajectory, at time $t=t_{k+1}$, and obtains information from the received radio signal 112b. The received radio signal is sent to a processor on board one of the sensing device 102, in some implementations. The received radio signal is sent to a processor in the receiver station 120 in some implementations.

In some implementations, information corresponding to additional radio signals are obtained from other emitters that are positioned or located at other candidate locations, e.g., locations 114, 116, 118 or 119. For example, the sensing device 102 receives radio signals from one or more other emitters corresponding to candidate locations 114, 116, 118 or 119. The received radio signals are sent to a processor on board the sensing device 102, in some implementations. The received radio signal is sent to a processor in the receiver station 120, in some implementations.

At 306, system 100 determines that a known pattern is present in each of the first information and the second information. As discussed above, system 100 uses PBCI to execute a geolocation technique that leverages stable patterned radio signal information from a radio emitter at the candidate location 112, along with precise or accurate knowledge of individual sensor trajectories of a single sensing device to establish a precise or accurate location estimate of the emitter or respective location estimates of multiple emitters.

Such a pattern can include one of the following characteristics: i) entire signal repeats (e.g., time-division multiplexed (TDM) frames); ii) a particular sequence within the signal repeats at a known interval; iii) orthogonal frequency division multiplexing (OFDM) subcarriers repeat periodically or at known offsets; or iv) other suitable signal repetition or patterning that can be determined.

At 308, conditioned on determining that the known pattern is present in each of the first information and the second information, a first relationship between the candidate location and the sensing device at the first location, and a second relationship between the candidate location and the sensing device at the second location are determined. Determining the respective first and second relationships between the sensing device 102 and the candidate location includes: i) determining a delay associated with the radio signal received from the candidate location when the sensing device 102 is at the respective first and second locations in its movement trajectory; and ii) determining a Doppler offset associated with the radio signal received from the candidate location when the sensing device 102 is at the respective first and second locations in its movement trajectory. Accordingly, at least one of the delay or the Doppler offset is determined based on knowledge of the movement trajectory of the sensing device 102.

For example, one or more of a time delay function and a Doppler offset function corresponding to the single sensing device 102 and the candidate location 112 is determined based on knowledge of the trajectory of the sensing device 102 at the first location 102a along its movement trajectory. Similarly, one or more of a time delay function and a Doppler offset function corresponding to the single sensing device 102 and the candidate location 112 is determined based on knowledge of the trajectory of the sensing device 102 at the second location 102b along its movement trajectory. Additionally, in some implementations, one or more of a time delay function and a Doppler offset function corresponding to the single sensing device 102 and the candidate location 112 is determined based on knowledge of the trajectory of the sensing device at a third location 102c along its movement trajectory.

As described above, the sensing device 102 moves along a defined trajectory such that a motion path of the sensing device 102 is known. The sensing device 102 hosts one or more sensors, which detect(s) signal emissions from an emitter on the ground at various locations along the trajectory of the sensing device 102 during movement of the device 102 along the known trajectory. For example, in some implementations, a sensor on board the sensing device 102 is used to detect multiple signal emissions from one or more emitters at different points in time and at different locations of the sensing device 102 along the known trajectory with respect to the emitters. The sensor detects the emissions as the sensing device 102 moves along its known trajectory and passes locations of the trajectory that correspond to 102a, 102b, 102c, and 102d (described above with reference to FIG. 1). For example, the sensor detects a first signal emission at time $t=t_k$ at a first location (102a) on the known trajectory of the sensing device 102; the sensor detects a second signal emission at time $t=t_{k+1}$ at a second location (102b) on the trajectory of the sensing device 102; the sensor detects a third signal emission at time $t=t_{k+2}$ at a third location (102c) on the trajectory of the sensing device 102; and the sensor detects a fourth signal emission at time $t=t_{k+3}$ at a fourth location (102d) on the trajectory of the sensing device 102; and so on.

At 310, a first inverse of the first relationship and a second inverse of the second relationship are obtained. For example, one or more of an inverse of the time delay function and an inverse of the Doppler offset function corresponding to the sensing device 102 and the candidate location 112 are determined, e.g., based on equation (1). The one or more first inverses of the first relationship corresponding to the sensing device 102 are obtained with reference to the first time, e.g., $t=t_k$, when the sensing device 102 is at the first location in its movement trajectory (102a). Hence, system 100 obtains at least one first inverse by determining an inverse of the delay associated with the radio signal received from the candidate location when the sensing device is at the first location. Similarly, one or more of another inverse of the time delay function and another inverse of the Doppler offset function corresponding to the sensing device 102 and the candidate location 112 are determined, e.g., based on equation (1). The one or more second inverses of the second relationship corresponding to the sensing device 102 are obtained with reference to a second time, e.g., $t=t_{k+1}$, when the sensing device 102 is at the second location in its movement trajectory (102b). Hence, system 100 obtains the at least one second inverse by also determining an inverse of the Doppler offset associated with the radio signal received from the candidate location when the sensing device is at the second location.

Additionally, in some implementations, multiple other inverses of the time delay function and inverses of the Doppler offset function corresponding to the sensing device 102 and the candidate location 112 is determined, e.g., based on equation (1). For example, the multiple other inverses of the other relationships corresponding to the sensing device 102 can be obtained with reference to the other times, e.g., at times $t=t_{k+2}$, $t=t_{k+3}$, etc., and when the sensing device 102 is at various other locations in its trajectory, e.g., respectively at locations 102c, 102d, and so on. As described in more detail below, obtaining the respective first and second inverses of the respective first and second relationships includes: i) obtaining a prediction of the candidate location 112; ii) obtaining knowledge of the movement trajectory of the sensing device 102; iii) determining the first or second location of the sensing device based on the knowledge of the trajectory; and iv) obtaining the respective first and second inverses of the respective first and second relationships based on the predictions of the candidate location 112 and the corresponding first or second locations of the sensing device 102.

At 312, a first estimate of the radio signal received at the sensing device from the candidate location is determined based on the first information and the first inverse, and a second estimate of the radio signal received at the sensing device from the candidate location is determined based on the second information and the second inverse. For example, an estimate of the signal energy corresponding to the emitter at the candidate location 112 is determined for the sensing device 102 based on the radio signal received at the sensing device 102 from the candidate location 112 when the sensing device is at location 102a in time interval $t=t_k$, and based on the inverse functions computed at 310, such as the inverse of the time delay function and/or the inverse of the Doppler offset function corresponding to the sensing device 102 and the candidate location 112. In some implementations, the first estimate is obtained using equation (2). Similarly, a second estimate of the signal energy corresponding to the emitter at the candidate location 112 is determined for the sensing device 102 based on the radio signal received at the sensing device 102 from the candidate location 112 when the sensing device 102 is at location 102b in time interval $t=t_{k+1}$, and based on the inverse functions computed at 310, such as the inverse of the time delay function and/or the inverse of the Doppler offset function corresponding to the sensing device 102 and the candidate location 112. In some implementations, the second estimate is also obtained using equation (2).

In some implementations, additional estimates of the signal energy corresponding to the emitter at the candidate location 112 is determined for the single sensing device 102 based on the radio signal received at the sensing device 102 from the candidate location 112, and based on the inverse functions computed at 310 for the sensing device 102, such as the inverse of the time delay function and/or the inverse of the Doppler offset function corresponding to the sensing device 102 and the candidate location 112 that are obtained with reference to the other times (e.g., a third time $t=t_{k+2}$) and when the sensing device 102 is at other locations (e.g., a third location such as 102c) in its movement trajectory. In some implementations, the additional estimates are also obtained using equation (2).

Determining the respective first and second estimates of the radio signal includes: i) computing a convolution of the first information and the first inverse of the first relationship; or ii) computing a convolution of the second information and the second inverse of the second relationship. For example, determining the first estimate of the radio signal includes: (i) applying one or more of a time interpolation, re-sampling, and shifting process to the first inverse; and (ii) mixing the first inverse with a local digital oscillator. Likewise, determining the second estimate of the radio signal includes: (i) applying one or more of a time interpolation, re-sampling, and shifting process to the second inverse; and (ii) mixing the second inverse with the local digital oscillator.

At 314, an energy emitted from the candidate location is measured or estimated based on the first estimate and the second estimate. Measuring or estimating the energy emitted from the candidate location based on the first estimate and the second estimate includes determining a distance metric between the first estimate and the second estimate, and measuring or determining the estimate of the energy as a function of the distance metric. For example, a distance metric is computed pairwise for the estimates of the signal energy corresponding to the emitter at the candidate location 112 that are determined for the sensing device 102 at 312. In some implementations, the distance metric is based on a coherent reception of the radio signal at the sensing device 102 at the first location (102*a*) in its movement trajectory and the second location (102*b*) in its movement trajectory. The distance metric can include one of an L2 error distance, an LN error distance, or a complex cross power distance. In some implementations, different distance metrics can be used, including, for example, L1 distance, L2 distance, complex-multiplicative distance, or other similar time-series distance metrics. By applying the distance metric, the energy emitted from the candidate location 112 is determined. In some implementations, the computation of the distance metric and obtaining the energy estimate are based on equation (3). In some implementations, measuring the energy emitted from a candidate location can include directly measuring the energy emitted from the location.

In the manner described in the preceding section, an example PBCI system (e.g., system 100) can measure multiple emissions with knowledge of a patterned radio signal $s_j$, and compute a distance metric between each pair of the emissions. In some implementations, at low SNR, the timing may not be known by the system, and the signal may occur at an SNR that is too low (e.g., below some threshold SNR) to observe energy. In such implementations, the computation of the distance metric can be done by evaluating the channel inverse receive signal for all time offsets within a pass or window, rather than for a specific time that may range from t to t+k. In such cases, integration can be performed while the sensor has visibility or line of sight to an entire region, city, or country, based on trajectory information. For example, performing the integration can include beginning at time t, when the region comes above the horizon, and ending the window at time t+k, when the region falls again below the horizon. In some cases, the integration could be computed for an entire orbit or scheduled time window arbitrarily if no specific region is of interest. Given a time interval of O (in seconds, minutes, hours, or some other suitable unit of measurement), the PBCI technique is used to pairwise compute the distance metrics between delays of timing (t, t+O), (t, t+2O), (t, t+3O), etc., to obtain, for a short time interval O (e.g., a couple or tens of milliseconds or seconds in some instances), multiple observations of delayed versions of the emitter signal of interest that can be combined into an aggregate distance metric additively, multiplicatively, or in any other linear or nonlinear combining strategy.

The coherent reception of the radio signal is based on the accuracy of the system clock on the sensing device 102, e.g., the system clock being within a pre-selected threshold value. As described above, in some implementations, the system clock is synchronized with a reference clock, which can correspond to one of a Global Navigation Satellite System (GNSS) signal, or a Global Positioning System (GPS) signal. In some implementations, system 100 causes an instruction signal to be sent to the sensing device 102 from the receiver station 120. The instruction signal directs the sensing device 102 to synchronize the system clock with the reference clock.

In some implementations, the energy emitted from the candidate location is measured or estimated based on the first estimate, the second estimate, and one or more additional estimates. For example, distance metrics are computed pairwise for the estimates of the signal energy corresponding to the emitter at the candidate location 112 that are determined at 312 for pairs of trajectory locations for the sensing device 102 in the system 100, such as sensing device trajectory locations 102*a* and 102*b*, 102*b* and 102*c*, 102*c* and 102*d*, including other pairs involving additional trajectory locations of sensing device 102 of the system 100. By applying the distance metric, the energy emitted from the candidate location 112 is determined. In such implementations, the computation of the distance metric and obtaining the energy estimate are based on one of equations (4) and (5). In some implementations, distance metrics are related to changed timing in patterned data of the radio signal from the emitter to derive equations to test the candidate locations against the observed data. The candidate locations can be searched in a grid method that is similar to other blind coherent integration techniques, e.g., with a large area search followed by a smaller area search, as described in more detail below.

In the above manner, the process 300 is used in some implementations to measure energy estimates corresponding to multiple candidate locations in a preselected area, based on radio signals received from emitters corresponding to the candidate locations at a single sensing device 102. In some implementations, to obtain the energy estimates, a determination is made whether the system clock of the single sensing device are synchronized with a reference clock, as described above. This is achieved, for example, by querying the sensing device 102 for its system clock value. Additionally or alternatively, this can be also achieved, by sending a reference clock signal to the sensing device 102 and confirming that the clock of the sensing device 102 is synchronized with the reference clock signal (e.g., upon receiving acknowledge responses from the sensing device 102).

By measuring the energy estimates corresponding to the multiple candidate locations, an energy surface spanning the preselected area is determined. For example, a result of process 300 is that, a heat-map of distance metrics for all candidate locations on the ground is obtained using signal measurements made by one sensing device, e.g., sensing device 102. This heat map provides low distance scores at inverted peaks on the ground where emitters are estimated to be emitting the patterned signal of interest. Further, this heat map can also provide a spatial map of locations at which unknown and low SNR signals are emitting. This spatial map of locations can be used for commercial radio deployment, spectrum assignment, connectivity analytics, emergency rescue missions, or numerous other radio applications. For example, each "hot" point on the heat map can represent a location of a cellular tower, a ship at sea, or some other radio signal emitter where mapping, coordination, or rescue provides a valuable service. As noted previously, a search strategy can be employed over the area or map to determine the actual locations of one or more target emitters, based on a priori knowledge of candidate locations corresponding to the target emitters.

The described PBCI technique does not require certain threshold SNR levels (e.g., high levels), or full information about the signal of interest, and multiple sensing devices 102 are not needed to obtain the location estimate. In some cases, high SNR levels describe signals whose power spectral energy is distinctly above that of an example noise floor and other signals at the same or nearby frequency. Such signals can be easily detected using energy detection techniques or demodulated using standard demodulation techniques due to their high signal to noise ratio. An example of high SNR could be 18 dB or a receive power of −70 dBm with a noise floor of −88 dBm and no interfering signals present. As another example, in some cases, an SNR of 3 dB might be considered high, where PBCI may be able to integrate and pull out signals below the noise floor at −10 dB SNR. The PBCI technique uses high-level information about the patterned nature of the signal, such as frame interval or repeating pattern time, to perform the multiple time observations, and thereby obtain single sensor estimates of ground emitter location for the band or signal of interest. In some implementations, using motion of a single sensing device 102, patterns in the emitter being observed over a sufficiently long period of time are obtained. This can facilitate a search for maximum probability locations of the emitter on the ground given the observed samples. Obtaining the patterns over a sufficiently long period requires, in some implementations, a clock of high precision and stability, as indicated above. With repeated looks at the emitter, errors of the estimation can be decreased, e.g., based on the strong law of large numbers. That is, multiple independent estimation trials provides a lower variance and higher confidence in the resulting aggregate estimate.

As noted previously, in some implementations, the PBCI technique assumes the availability of an onboard high stability clock. An example of such a clock is one derived from a Global Positioning System (GPS) reference clock that provides approximately 0.5 parts per billion (ppb) stability. This can be contrasted to a clock that uses a free running low-grade commercial crystal oscillator, which can provide around 2.0 parts per million (ppm). In some implementations, evaluation of the PBCI algorithm is conducted on the ground using receiver station 120 where data-center class computational resources (e.g., racks of servers or graphics cards) may be more readily available.

In some implementations, timing stability of the sensing device 102 affects the accuracy of the signal measurements as well as the constructive addition of signal emissions occurring at time offsets. In some implementations, the timing stability of the emitters is assumed, but can also be jointly estimated with other parameters, e.g., included as part of the search space of the system 100. In some implementations, sensing device timing stability is achieved through the use of high stability free running oscillators, such as rubidium or high quality oven-corrected oscillators, or through the use of high-quality onboard reference signal receivers (such as locking to the GPS constellation or other stable signals that can be seen from the sensing device). In some implementations, sensing device timing stability is achieved through later algorithmic correction of a received signal through estimation and removal of timing error based on a particular reference clock signal that has also been observed.

When processing received emitter signals on the ground using the PBCI technique, the system 100 can provision for sufficient storage resources (e.g., enough space on computer-readable memory, such as a hard disk, flash disk, random access memory, or other types tangible storage to store data representing the emitter signals) to retain received signals with sufficient fidelity (e.g., having a threshold number of bits per sample or compression ratio) so as to not degrade results of the computations (e.g., reduce the signal to noise ratio of the signal of interest or otherwise destroy useful information content used in processing). In some implementations, system 100 also establishes an infrastructure for transmitting, to the ground for processing e.g., at receiver station 120, the radio signals in either a compressed or an uncompressed data format. As an example, in some implementations, a compression scheme that is used to transport waveforms to the ground is the free lossless audio codec (FLAC), which is lossless and expected not to degrade signal quality or information content. Instead of sending raw sample data, one or more options for lossy or lossless codecs, or other compression schemes, can be used to transport waveforms to the ground.

Figure 4:
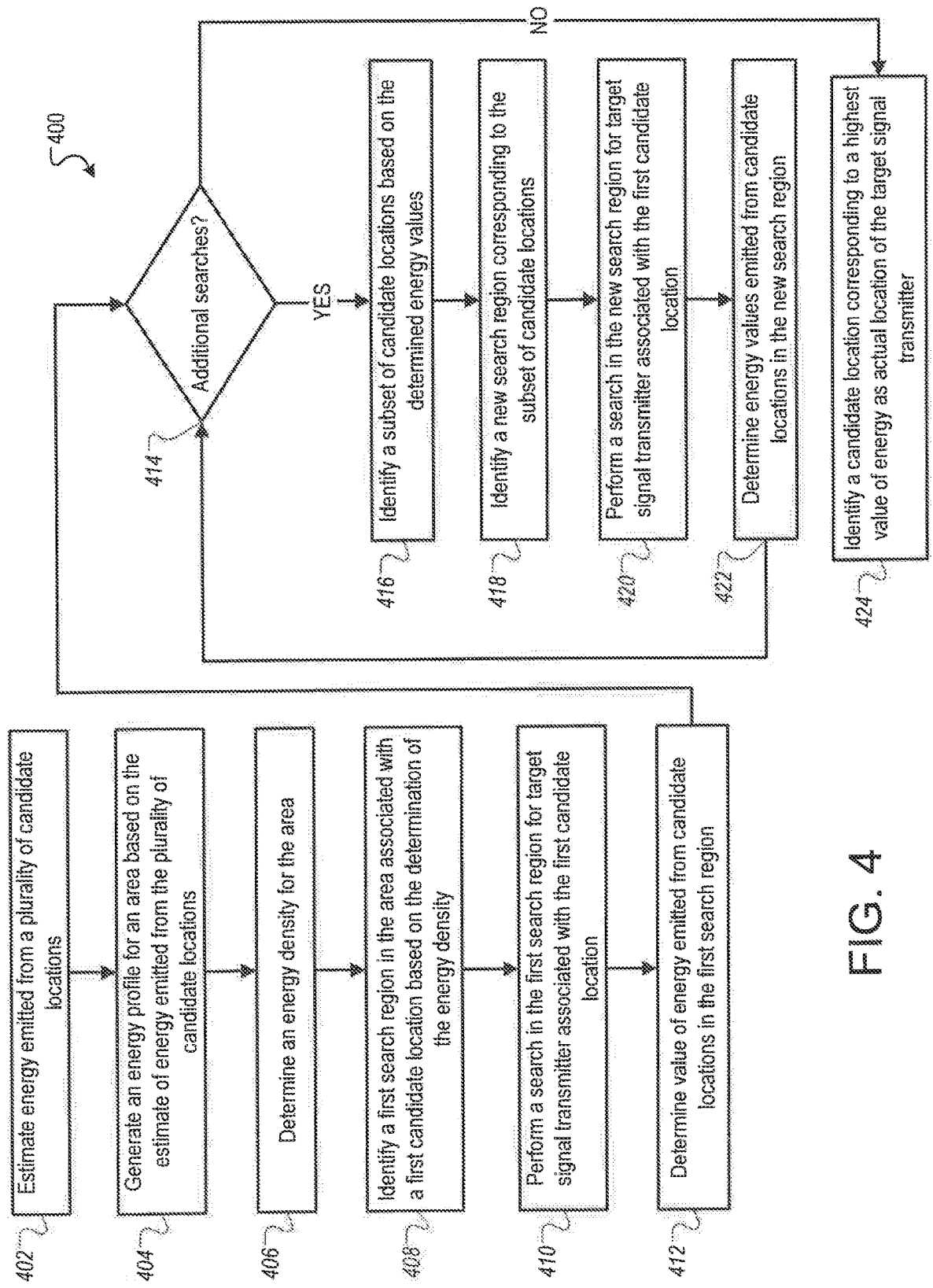
FIG. 4 illustrates an example of a process performing a search over an energy surface corresponding to an area, according to one or more implementations.

FIG. 4 illustrates an example of a process 400 for performing a search over an energy surface corresponding to an area, according to one or more implementations. The process 400 can be performed by components of the system 100. For example, the process 400 can be performed by the sensing device 102, the receiver station 120, or by a combination of both. Accordingly, the following sections describe the process 400 with respect to the system 100. However, the process 400 also can be performed by other suitable devices or systems.

In some implementations, the process 400 is performed by one or more processors associated with the respective device(s) performing the process 400. For example, the sensing device 102 can perform the process 400 by executing instructions corresponding to the process 400 that are stored in memory coupled to the sensing device. The instructions are executed by one or more processors coupled to the sensing device 102. Additionally or alternatively, in some implementations, the receiver station 120 can perform the process 400 by executing instructions corresponding to the process 400 that are stored in memory coupled to the receiver station 120. The instructions are executed by one or more processors coupled to the receiver station 120.

In some implementations, the process 400 is performed following the process 300. For example, an energy surface spanning a preselected area is determined using the process 300. Subsequently, the process 400 is used to perform one or more searches over the area to determine actual locations of one or more target emitters.

At 402, energy emitted from a plurality of candidate locations are measured or estimated. For example, as discussed above with reference to 314, a distance metric is computed pairwise for the estimates of radio signal energy that are received at the sensing device 102 from emitters corresponding to candidate locations (e.g., candidate locations 112, 114, 116, 118 and 119) in a preselected area (e.g., area 110). By applying the distance metric, the energy emitted from the candidate locations are estimated or otherwise measured.

At 404, an energy profile for an area is generated based on the measurement or estimate of energy emitted from the plurality of candidate locations. For example, an energy surface (e.g., energy surface 200A) is generated for the area 110 based on the energy estimates corresponding to candidate locations 112, 114, 116, 118 and 119, among others. Each point in the area 110 is mapped to an energy value that is included in the energy surface.

At 406, an energy density for the area is determined. For example, the grid points in the energy surface that correspond to non-zero energy values are identified. As an illustrative example, the locations 202, 204 and 206, among others, correspond to grid points in the energy surface 200A with non-zero energy values. The distance between the non-zero energy grid points and the clustering of the grid points in each unit block of the energy surface are determined.

At 408, a first search region is identified in the area associated with a first candidate location based on the determination of the energy density. For example, a search strategy is employed to determine the location of emitters in the area. Upon determining the densities of the grid points in the energy surface, a search region is identified. As described previously, the search region can be a coarse search region, such as the area covered by the energy surface 200A. Alternatively, the search region can be a fine-grained smaller area, such as the sub-region 203 or 205.

At 410, a search is performed in the first search region for target signal transmitter associated with the first candidate location. For example, a first search is performed over the area represented by the energy surface 200A.

At 412, value of energy emitted from candidate locations in the first search region are determined. For example, the energy values corresponding to the locations 202, 204 and 206 are obtained by performing a search in the energy surface 200A.

At 414, a determination is made whether additional searches are to be performed. For example, the first search can be a coarse wide area grid search over the area of interest, such as the energy surface 200A. Once a sub-area is identified corresponding to the target location, then a more refined search can be performed over the sub-area.

If a determination is made at 414 that additional searches are to be performed, then at 416, a subset of candidate locations is identified based on the determined energy values. For example, by searching the energy surface 200A, one or more of candidate locations 202, 204 and 206 are identified. In some implementations, the energy value for each point or location in the energy surface is compared to a preselected threshold value, and candidate locations that correspond to energy values higher than the threshold are selected. Alternatively, in some implementations, candidate locations that correspond to energy values lower than the threshold are selected. The threshold value can be set by a user of the system, or it can be set as a design parameter. The threshold value can be updated depending on the desired targets to be identified by the search. For example, for low energy emitters, which can be difficult to distinguish from the noise floor, the threshold can be set to a low first value, while for medium or higher energy emitters, the threshold can be set to a higher value in comparison to the first value. For example, for low energy emitters, the threshold can be set to maximize probability of detection. In contrast, for high-energy emitters, the threshold can be set to minimize probability of false alarm.

In some implementations, relative energy values are considered instead of absolute energy values. The energy value of an emitter can be computed by integrating the arriving signal power for a specified time period. As an example, for a signal that is received at −120 decibel-milliwatts (dBm) and integrated for 1 second, the range for low energy emitters can range from 10-20 joules up to 10-15 joules; the range of energy values from 10-15 joules to 10-10 joules can correspond to medium energy emitters; and energy values greater than 10-10 joules can correspond to high energy emitters. Other thresholds can be used in different implementations.

In some implementations, the energy values for each point or location in the energy surface are ordered, e.g., in either ascending or descending order of values. The candidate location that corresponds to the highest energy value (e.g., estimated value), or candidate locations that correspond to the top M highest energy values (where M is a positive integer greater than 1), are selected. In implementations where the top M highest every values are selected, M is a system parameter. M can be set by a user of the system, or it can be set as a design parameter. M can be updated depending on the desired targets to be identified by the search. For example, for low energy emitters, M can be set to a first value, while for medium or higher energy emitters, M can be set to a lower value in comparison to the first value set for low energy emitters.

At 418, a new search region corresponding to the subset of candidate locations is identified. For example, upon determining the subset of candidate locations at 416, one or more areas that cover a known range around the subset of candidate locations, and include the subset of candidate locations, are identified as new search region(s).

At 420, a search is performed in the new search region for a target signal transmitter associated with the first candidate location. For example, a first search is performed over a wide area (e.g., corresponding to energy surface 200A) to determine one or more candidate locations, as described above. Subsequently, a fine-grained search is performed over a smaller region (e.g., corresponding to region 203 and/or 205) that cover the one or more locations identified in the first search.

At 422, energy values emitted from candidate locations in the new search region are determined. For example, energy values corresponding to the locations in the sub region covered 203 or 205 are obtained by performing a search in the respective region. Subsequently, the process reverts to 414 to determine whether additional searches are to be performed, and iterates over 416-422 as long as more searches are to be performed to identify candidate locations with the desired level of granularity or specificity regarding the locations.

If a determination is made at 414 that additional searches are not to be performed, then at 424, a candidate location corresponding to an estimated highest value of energy is identified as actual location of the target signal transmitter. For example, in some implementations, following the first search at 412, the candidate location corresponding the highest value of estimated energy in the region searched is identified as the actual location of the target signal emitter. In some implementations, following iterative searches performed at 416-422, a location is identified with finer granularity as the actual location of the target signal emitter.

In some implementations, actual locations of two or more target signal emitters are identified. For example, the candidate locations corresponding to the N highest values of estimated energy (where N is a positive integer greater than 1) in the region searched are identified as actual locations of N target signal emitters. In some implementations, the candidate locations are identified as actual locations only if the corresponding estimated energy are greater than a known threshold energy level. In some implementations, N is a system parameter. N can be set by a user of the system, or it can be set as a design parameter.

Figure 5:
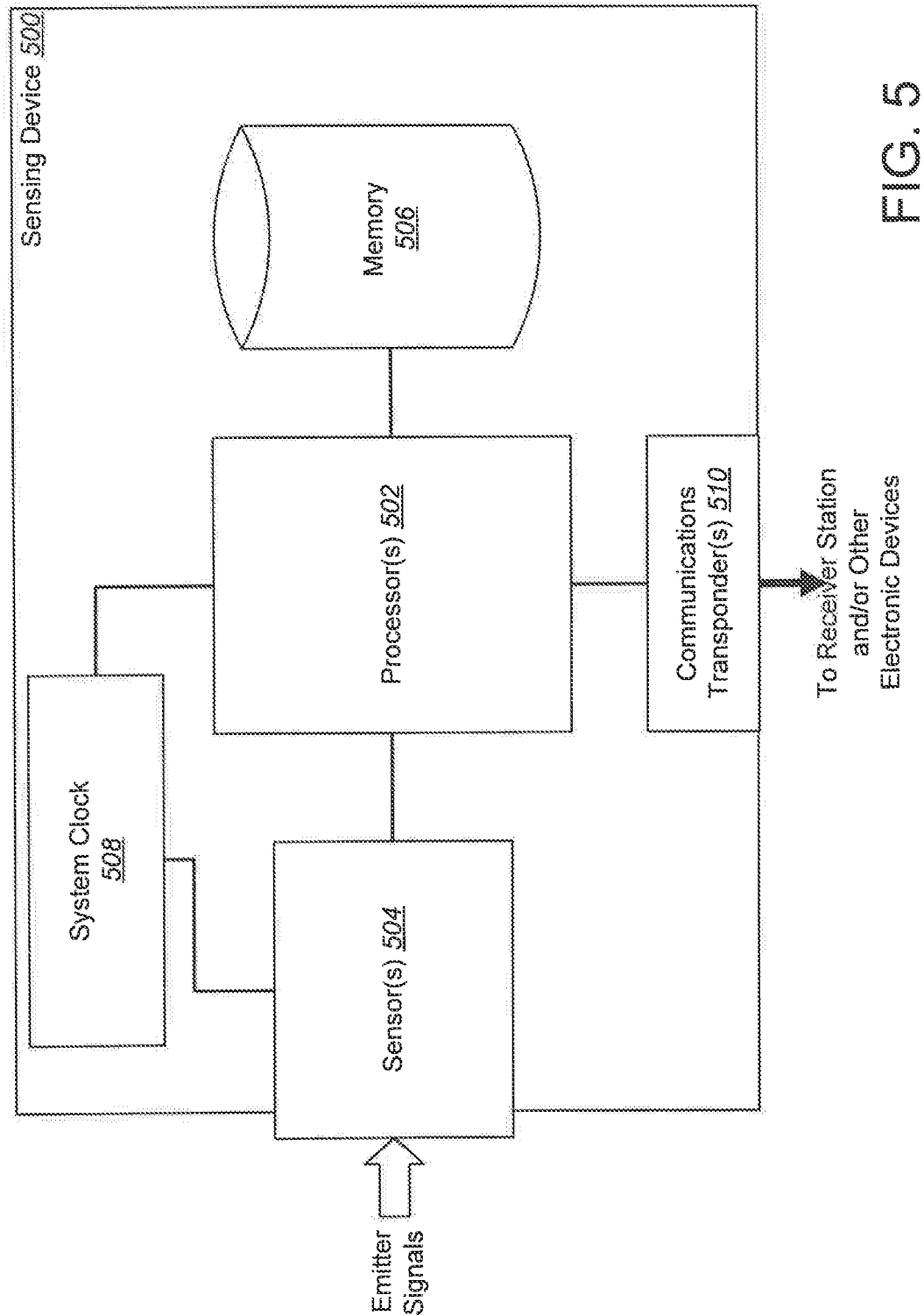
FIG. 5 illustrates a block diagram of an example of a sensing device, according to one or more implementations.

FIG. 5 illustrates a block diagram of an example of a sensing device 500, according to one or more implementations. The sensing device 500 is similar to the sensing device 102 in some implementations. The sensing device 500 includes one or more processors 502, one or more sensors 504, memory 506, a system clock 508 and one or more communications transponders 510.

In some implementations, the sensing device 500 includes one processor 502. In other implementations, the sensing device includes multiple processors, which are collectively indicated as 502. The one or more processors 502 execute instructions to perform various operations. In some implementations, the one or more processors 502 execute instructions that are stored in the memory 506. The instructions include signal processing and control functions. As described previously, in some implementations, the instructions include operations corresponding to performing PBCI computations and/or controlling the sensing device to perform coarse or fine-grained search over energy surfaces. In some implementations, the one or more processors 502 execute instructions stored in the memory 506 to perform the operations of the process 300 and/or the process 400. In some implementations, the described PBCI techniques can be implemented on board the sensing device 500. This facilitates a simplified system 100 that uses a sensor 504 on board a single sensing device 102 (e.g., a spacecraft such as a satellite), without the need for cross-linking any information from other sensors or sensing devices, thereby reducing downlink bandwidth requirements.

In some implementations, ranging to the sensors 504 from the receiver station 120 can be performed to optimize the estimation of the orbital parameters/sensor trajectory knowledge. The ranging can be performed, for example, by transmitting known signals from known locations at known times, and then receiving these signals at the sensor and determining any error between expected timing and location information resulting from trajectory or clock error to refine knowledge of the trajectory, or to improve a timing reference on the sensor. Estimation from the sensor is then optimized due to a reduction in uncertainty surrounding the position, velocity, and time of the sensor. In some implementations, an aperture of the sensors 504, e.g., time period for which a sensor is listening for emitted signals from the ground, is sufficiently long to yield a signal-to-interference noise ratio (SINR) that has a value greater than a particular threshold value. The threshold SINR value is determined such that the SINR readings are usable for the described equations that relate location of the emitter to a position(s) of the spacecraft (e.g., sensing device 500) in orbit.

In some implementations, the one or more processors 502 are general purpose multiprocessors. In some implementations, the one or more processors 502 include digital signal processing (DSP) features, general-purpose pre-processor(s) (GPP), general-purpose graphics processing unit(s) (GPGPU), or field-programmable gate array(s) (FPGA). In some implementations, the one or more processors 502 include parallel processing capabilities, e.g., the one or more processors include GPU hardware. In such cases, the instructions corresponding to the PBCI computations and/or the search operations are customized such that they are executed efficiently using the parallel processors 502. This leads to improvement in the functioning of the sensing device 500, e.g., leading to faster execution, lower expenditure of energy of the sensing device 500, and/or lower heat generation in the sensing device 500. In this manner, the parallel execution of the instructions corresponding to the PBCI computations and/or the search operations extend the lifecycle of the sensing device 500. This is useful, for example, when the sensing device 500 is a spacecraft, such as a satellite, e.g., a device that is not readily replaceable.

In some implementations, the sensing device 500 includes one sensor 504. In other implementations, the sensing device includes multiple sensors, which are collectively indicated as 504. The one or more sensors 504 receive radio signals, e.g., signals from emitters on the Earth's surface. In some implementations, the emitter(s) is on and emitting for a sufficient or threshold amount time, such that multiple signal emissions from the emitter can be detected by the sensor(s) 504 using the PBCI technique and with reasonably high probability during movement of the sensing device 502 past a location of the emitter, thereby enabling repeated readings of the emitted signal. In some implementations, the one or more sensors 504 include antenna elements that detects radio frequency signals. The one or more sensor(s) 504 can also include a receiver or tuner and a filter, which process the signals detected by the antenna elements. Each of the one or more sensors 504 can further include a digitizer, e.g., an analog to digital (A/D) converter, which converts the received analog emitter signals into digital signals for processing by the processor(s) 502. In some implementations, the one or more sensors 504 share the antenna elements with other components of the sensing device 500, e.g., the communications transponder(s) 510.

The memory 506 stores instructions that are executed by the processor(s) 502, as described above. The memory 506 also stores emitter signals detected by the sensor(s) 504, and/or the results of the computations and search functions that are performed by the sensing device 500. In some implementations, the memory 506 includes one or more of random access memory (RAM), various types of read-only memory (ROM), and other long-term storage memory, such as non-volatile flash memory. Additionally or alternatively, in some implementations, the memory 506 includes hard drive storage, or other suitable storage media, such as storage disks.

The system clock 508 is a system clock for the sensing device 500. As noted previously, in some implementations, the computations for the PBCI techniques are performed when the system clock of the sensing device is synchronized with at least one other system clock of system 100 (e.g., a system clock of receiver station 120). The system clock 508 is synchronized with a stable reference signal, e.g., a GNSS or GPS signal, or by receiving a reference signal directly from a receiver station of system 100 (such as receiver station 120).

In some implementations, the sensing device 500 includes one communications transponder 510. In other implementations, the sensing device includes multiple communications transponders, which are collectively indicated as 510. The one or more communications transponders 510 communicate with one or more receiver stations of system 100. In some implementations, the communications transponder(s) include downlink/uplink communications transponder(s), which communicate with a receiver station (e.g., receiver station 120) for command and control instructions, to transmit emitter signals received at the sensing device 500, and/or processed information about the emitter signals following processing performed on board the sensing device 500. In some implementations, the communications transponder(s) include crosslink communications transponder(s), which communicates with other nearby electronic devices of system 100 (e.g., another sensing device similar to sensing device 102, or a different satellite or ground transponder) to coordinate command and control functions, tasking, synchronous observation, sharing recordings and computing information about multi-channel recordings, among other operations.

Figure 6:
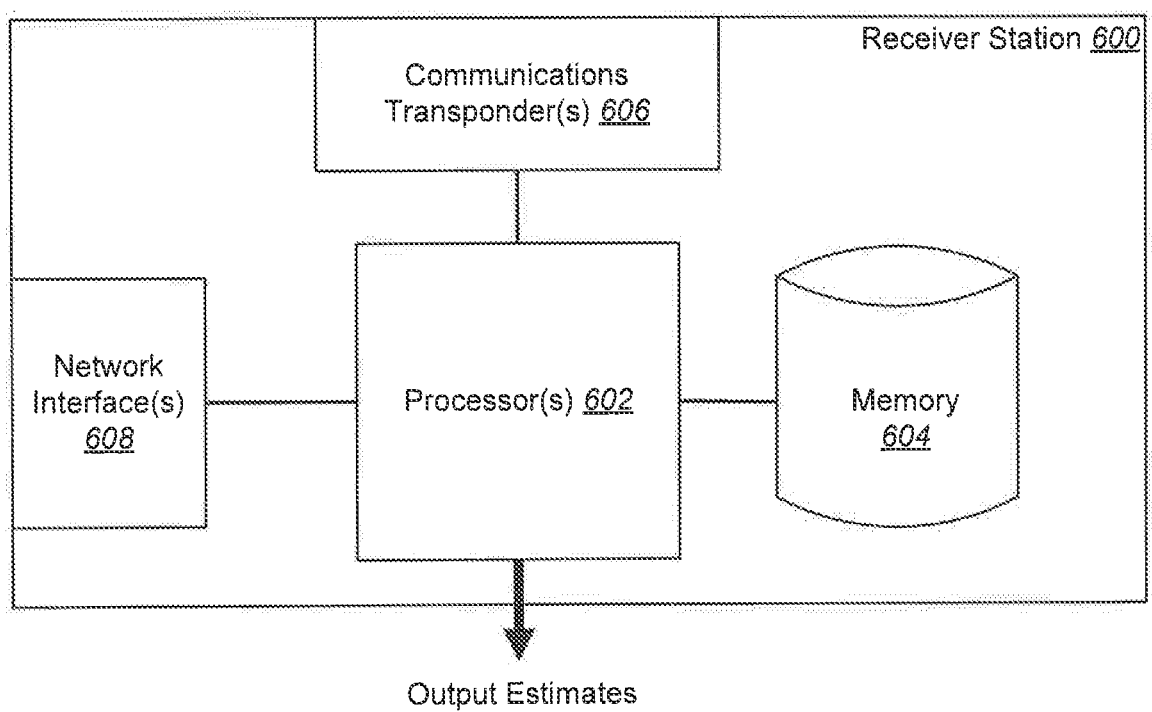
FIG. 6 illustrates a block diagram of an example of a receiver station, according to one or more implementations.

FIG. 6 illustrates a block diagram of an example of a receiver station 600, according to one or more implementations. The receiver station 600 is similar to the receiver station 120 in some implementations. The receiver station 600 includes one or more processors 602, memory 604, one or more communications transponders 606 and one or more network interfaces 608.

In some implementations, the receiver station 600 includes one processor 602. In other implementations, the receiver station 600 includes multiple processors, which are collectively indicated as 602. In some implementations, the one or more processors 602 execute instructions that are stored in the memory 604. As described previously, in some implementations, the instructions include operations corresponding to performing PBCI computations and/or controlling the sensing device 102 to perform coarse or fine-grained search over energy surfaces to identify emitter locations.

These operations include, among others, processing emitter signals received from the sensing device 102 into estimates of locations, users, timing, and other useful signal metrics. In some implementations, the one or more processors 602 execute instructions stored in the memory 604 to perform the operations of the process 300 and/or the process 400. The processors 602 output the estimates to a user or administrator, e.g., through a display coupled to the receiver station 600, and/or transmit the estimates to other devices, e.g., other receiver stations or network nodes.

In some implementations, the one or more processors 602 are general purpose multiprocessors. In some implementations, the one or more processors 602 include digital signal processing (DSP) features, general-purpose pre-processor(s) (GPP), general-purpose graphics processing unit(s) (GPGPU), or field-programmable gate array(s) (FPGA), or a suitable combination of these. In some implementations, the one or more processors 602 include parallel processing capabilities, e.g., the one or more processors include GPU hardware. In such cases, the instructions corresponding to the PBCI computations and/or the search operations are customized such that they are executed efficiently using the parallel processors 602. This leads to improvement in the functioning of the receiver station 600, e.g., leading to faster execution, lower expenditure of energy, and/or lower heat generation. In this manner, the parallel execution of the instructions corresponding to the PBCI computations and/or the search operations improve the functionality of the receiver station 600. This is useful, for example, when the receiver station 600 processes a large number of emitter signals, e.g., covering a large area and/or multiple areas and that are received from the sensing device.

The memory 604 stores instructions that are executed by the processor(s) 602, as described above. The memory 604 also stores emitter signals that are received from the sensing device, and/or the results of the computations and search functions that are performed by the receiver station 600. In some implementations, the memory 604 stores additional information, such as application logs, process tasking information, planning and analysis information, among others. In some implementations, the processor(s) 602 executes additional signal processing operations, such as filtering, detection, or compression, on the signal. In some implementations, the processor(s) 602, execute additional measurement and estimation of timing, distance, or candidate locations, or any suitable combination of these.

In some implementations, the memory 604 includes one or more of random access memory (RAM), various types of read-only memory (ROM), and other long-term storage memory, such as non-volatile flash memory, hard drive storage, storage disks, or other suitable storage media.

In some implementations, the receiver station 600 includes one communications transponder 606. In other implementations, the receiver station 600 includes multiple communications transponders, which are collectively indicated as 606. In some implementations, the communications transponder(s) 606 include downlink/uplink communications transponder(s), which are used to communicate with the sensing device, e.g., to transmit command and control instructions, receive emitter signals obtained by the one or more sensors on the sensing device, or process information about these signals that are generated by one or more sensing device. In some implementations, the receiver station 600 uses the downlink/uplink communications transponders to send updates to firmware and/or software (e.g., updates to the algorithms) stored in sensing device memory.

In some implementations, the receiver station 600 includes one network interface 608. In other implementations, the receiver station 600 includes multiple network interfaces, which are collectively indicated as 608. The receiver station connects to one or more terrestrial networks, e.g., using local area network (LAN) or wide area network (WAN) connections, through the network interfaces 608. The receiver station 600 communicates with other receiver stations or other network devices on the ground, or to remote datacenters, through the terrestrial networks that are accessed over the network interfaces 608. In this manner, in some implementations, the processors 602 communicate the computed estimates, which are noted above, to other network devices or receiver stations through or using the network interfaces 608.

The disclosed and other examples can be implemented as one or more computer program products, for example, one or more modules of computer program instructions encoded on a computer readable medium for execution by, or to control the operation of, data processing apparatus. The implementations can include single or distributed processing of algorithms. The computer readable medium can be a machine-readable storage device, a machine-readable storage substrate, a memory device, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A system may encompass all apparatus, devices, and machines for processing data, including by way of example a programmable processor, a computer, or multiple processors or computers. A system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and the computer program can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communications network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method comprising:
   obtaining first information from a first radio signal received at a sensing device from a candidate location, wherein the first radio signal is received at the sensing device when the sensing device is at a first location in a movement trajectory, and wherein the movement trajectory of the sensing device is known;
   obtaining second information from a second radio signal received at the sensing device from the candidate location, wherein the second radio signal is received at the sensing device when the sensing device is at a second location in the movement trajectory;
   determining that a common pattern is present in each of the first information and the second information;
   conditioned on determining that the common pattern is present in each of the first information and the second information:
      determining a first estimate of the first radio signal based on the first information, and a second estimate of the second radio signal based on the second information; and
      determining an estimate of an energy emitted from the candidate location based on the first estimate and the second estimate.

2. The method of claim 1, wherein determining the estimate of the energy emitted from the candidate location comprises:
   obtaining respective additional information from one or more additional radio signals received at the sensing device from the candidate location wherein the one or more additional radio signals are received at the sensing device when the sensing device is at one or more additional locations in the movement trajectory;
   determining that the common pattern is present in the additional information;
   conditioned on determining that the common pattern is present in the additional information:
      determining a respective estimate of the one or more additional radio signals based on the respective additional information; and
      determining the estimate of the energy emitted from the candidate location based on the first estimate, the second estimate, and the respective estimate of the one or more additional radio signals.

3. The method of claim 1, wherein determining that the common pattern is present in each of the first information and the second information comprises:
   determining that a system clock corresponding to operation of the sensing device has an accuracy within a pre-selected threshold value.

4. The method of claim 3, wherein determining that the common pattern is present in each of the first information and the second information comprises:
   synchronizing the system clock with at least one of a Global Navigation Satellite System (GNSS) signal or a Global Positioning System (GPS) signal;
   determining that the system clock has an accuracy within a pre-selected threshold value in response to synchronizing the system clock; and
   determining that the common pattern is present in each of the first information and the second information using the system clock that has the accuracy within the pre-selected threshold value.

5. The method of claim 3, wherein determining the estimate of the energy emitted from the candidate location based on the first estimate and the second estimate comprises:
   computing a distance metric between the first estimate and the second estimate, the distance metric being based on a coherent reception of the first radio signal and the second radio signal,
   wherein the coherent reception of the radio signal is based on the accuracy of the system clock being within the pre-selected threshold value; and
   determining the estimate of the energy as a function of the distance metric.

6. The method of claim 5, wherein determining the estimate of the energy emitted from the candidate location comprises:
synchronizing the system clock with at least one of a Global Navigation Satellite System (GNSS) signal or a Global Positioning System (GPS) signal;
determining that the system clock has an accuracy within a pre-selected threshold value in response to synchronizing the system clock; and
determining the estimate of the energy emitted from the candidate location by computing the distance metric between the first estimate and the second estimate using the system clock that has the accuracy within the pre-selected threshold value.

7. The method of claim 5, wherein the distance metric includes one of an L2 error distance, an LN error distance, or a complex cross power distance.

8. The method of claim 1, wherein:
determining the first estimate comprises determining a propagation delay corresponding to receiving the first radio signal from the candidate location when the sensing device is at the first location in the movement trajectory, and
determining the second estimate comprises determining a propagation delay corresponding to receiving the second radio signal from the candidate location when the sensing device is at the second location in the movement trajectory.

9. The method of claim 1, wherein:
determining the first estimate comprises determining a Doppler offset corresponding to receiving the first radio signal from the candidate location when the sensing device is at the first location in the movement trajectory, and
determining the second estimate comprises determining a Doppler offset corresponding to receiving the second radio signal from the candidate location when the sensing device is at the second location in the movement trajectory.

10. The method of claim 1, wherein:
determining the first estimate comprises determining each of a propagation delay and a Doppler offset corresponding to receiving the first radio signal from the candidate location when the sensing device is at the first location in the movement trajectory, and
determining the second estimate comprises determining each of a propagation delay and a Doppler offset corresponding to receiving the second radio signal from the candidate location when the sensing device is at the second location in the movement trajectory.

11. The method of claim 1, wherein:
the sensing device includes a sensor on a mobile platform that is communicably coupled to a ground receiving station, and
obtaining the first information corresponding to the first radio signal comprises obtaining, at the ground receiving station, the first information from the mobile platform.

12. The method of claim 11, wherein the mobile platform is one of: a Low Earth Orbit (LEO) satellite, a Medium Earth Orbit (MEO) satellite, a Geosynchronous Orbit (GEO) satellite, a nano satellite, an unmanned aerial vehicle (UAV), or a terrestrial vehicle.

13. A system comprising:
one or more processing devices; and
one or more non-transitory machine-readable storage devices storing instructions that are executable by the one or more processing devices to cause performance of operations comprising:
obtaining first information from a first radio signal received at a sensing device from a candidate location, wherein the first radio signal is received at the sensing device when the sensing device is at a first location in a movement trajectory, and wherein the movement trajectory of the sensing device is known;
obtaining second information from a second radio signal received at the sensing device from the candidate location, wherein the second radio signal is received at the sensing device when the sensing device is at a second location in the movement trajectory;
determining that a common pattern is present in each of the first information and the second information;
conditioned on determining that the common pattern is present in each of the first information and the second information:
determining a first estimate of the first radio signal based on the first information, and a second estimate of the second radio signal based on the second information; and
determining an estimate of an energy emitted from the candidate location based on the first estimate and the second estimate.

14. The system of claim 13, wherein determining the estimate of the energy emitted from the candidate location comprises:
obtaining respective additional information from one or more additional radio signals received at the sensing device from the candidate location wherein the one or more additional radio signals are received at the sensing device when the sensing device is at one or more additional locations in the movement trajectory;
determining that the common pattern is present in the additional information;
conditioned on determining that the common pattern is present in the additional information:
determining a respective estimate of the one or more additional radio signals based on the respective additional information; and
determining the estimate of the energy emitted from the candidate location based on the first estimate, the second estimate, and the respective estimate of the one or more additional radio signals.

15. The system of claim 13, wherein:
determining that the common pattern is present in each of the first information and the second information comprises:
determining that a system clock corresponding to operation of the sensing device has an accuracy within a pre-selected threshold value.

16. The system of claim 15, wherein determining that the common pattern is present in each of the first information and the second information comprises:
synchronizing the system clock with at least one of a Global Navigation Satellite System (GNSS) signal or a Global Positioning System (GPS) signal;
determining that the system clock has an accuracy within a pre-selected threshold value in response to synchronizing the system clock; and determining that the common pattern is present in each of the first information and the second information using the system clock that has the accuracy within the pre-selected threshold value.

17. The system of claim 15, wherein determining the estimate of the energy emitted from the candidate location based on the first estimate and the second estimate comprises:
computing a distance metric between the first estimate and the second estimate, the distance metric being based on a coherent reception of the first radio signal and the second radio signal,
wherein the coherent reception of the radio signal is based on the accuracy of the system clock being within the pre-selected threshold value; and
determining the estimate of the energy as a function of the distance metric.

18. The system of claim 17, wherein determining the estimate of the energy emitted from the candidate location comprises:
synchronizing the system clock with at least one of a Global Navigation Satellite System (GNSS) signal or a Global Positioning System (GPS) signal;
determining that the system clock has an accuracy within a pre-selected threshold value in response to synchronizing the system clock; and
determining the estimate of the energy emitted from the candidate location by computing the distance metric between the first estimate and the second estimate using the system clock that has the accuracy within the pre-selected threshold value.

19. The system of claim 17, wherein the distance metric includes one of an L2 error distance, an LN error distance, or a complex cross power distance.

20. The system of claim 13, wherein:
determining the first estimate comprises determining a propagation delay corresponding to receiving the first radio signal from the candidate location when the sensing device is at the first location in the movement trajectory, and
determining the second estimate comprises determining a propagation delay corresponding to receiving the second radio signal from the candidate location when the sensing device is at the second location in the movement trajectory.

21. The system of claim 20, wherein:
determining the first estimate comprises determining a Doppler offset corresponding to receiving the first radio signal from the candidate location when the sensing device is at the first location in the movement trajectory, and
determining the second estimate comprises determining a Doppler offset corresponding to receiving the second radio signal from the candidate location when the sensing device is at the second location in the movement trajectory.

22. One or more non-transitory machine-readable storage devices storing instructions that are executable by one or more processing devices to cause performance of operations comprising:
obtaining first information from a first radio signal received at a sensing device from a candidate location, wherein the first radio signal is received at the sensing device when the sensing device is at a first location in a movement trajectory, and wherein the movement trajectory of the sensing device is known;
obtaining second information from a second radio signal received at the sensing device from the candidate location, wherein the second radio signal is received at the sensing device when the sensing device is at a second location in the movement trajectory;
determining that a common pattern is present in each of the first information and the second information;
conditioned on determining that the common pattern is present in each of the first information and the second information:
determining a first estimate of the first radio signal based on the first information, and a second estimate of the second radio signal based on the second information; and
determining an estimate of an energy emitted from the candidate location based on the first estimate and the second estimate.

* * * * *